(12) United States Patent
Pill et al.

(10) Patent No.: US 11,685,550 B1
(45) Date of Patent: Jun. 27, 2023

(54) RECHARGING STATION FOR ELECTRIC AIRCRAFTS AND A METHOD OF ITS USE

(71) Applicant: BETA AIR, LLC, South Burlington, VT (US)

(72) Inventors: Jake Pill, South Burlington, VT (US); Cole William Hanson, Burlington, VT (US)

(73) Assignee: BETA AIR, LLC, South Burlington, VT (US)

(*) Notice: Subject to any disclaimer, the term of this patent is extended or adjusted under 35 U.S.C. 154(b) by 0 days.

(21) Appl. No.: 17/824,277

(22) Filed: May 25, 2022

(51) Int. Cl.
| | |
|---|---|
| *B64F 1/36* | (2017.01) |
| *B64C 29/00* | (2006.01) |
| *B60L 53/35* | (2019.01) |
| *B60L 53/16* | (2019.01) |
| *B60L 53/18* | (2019.01) |
| *H02J 7/00* | (2006.01) |
| *H02J 7/35* | (2006.01) |
| *B60L 53/51* | (2019.01) |

(52) U.S. Cl.
CPC ............. *B64F 1/362* (2013.01); *B60L 53/16* (2019.02); *B60L 53/18* (2019.02); *B60L 53/35* (2019.02); *B60L 53/51* (2019.02); *B64C 29/0008* (2013.01); *H02J 7/00034* (2020.01); *H02J 7/35* (2013.01); *B60L 2200/10* (2013.01); *H02J 2207/20* (2020.01); *H02J 2300/22* (2020.01)

(58) Field of Classification Search
CPC ....... B60L 53/18; B60L 2200/10; B64F 1/362
See application file for complete search history.

(56) References Cited

U.S. PATENT DOCUMENTS

| | | | | |
|---|---|---|---|---|
| 2021/0284357 A1* | 9/2021 | Villa | ......................... | B64F 1/36 |
| 2022/0169401 A1* | 6/2022 | Di Cosola | ............... | H02J 50/10 |
| 2022/0340030 A1* | 10/2022 | Todeschini | .............. | B60L 53/36 |

FOREIGN PATENT DOCUMENTS

| | | | |
|---|---|---|---|
| CN | 108082027 A | * | 5/2018 |
| WO | WO-2020241677 A1 | * | 12/2020 |

OTHER PUBLICATIONS

Machine translation of WO-2020241677-A1 (Year: 2022).*
Machine translation of CN-108082027-A (Year: 2022).*

* cited by examiner

*Primary Examiner* — David V Henze-Gongola
(74) *Attorney, Agent, or Firm* — Caldwell Intellectual Property Law

(57) ABSTRACT

An apparatus and method for a recharging station including a landing pad, a rechargeable component coupled to the landing pad, and a power delivery unit configured to deliver power from a power supply unit or power storage unit to the recharging component. Rechargeable component includes a plurality of charging units placed at predetermined spacings from one another. The plurality of charging units allows for the electric aircraft to land in any orientation.

19 Claims, 12 Drawing Sheets

US 11,685,550 B1

RECHARGING STATION FOR ELECTRIC AIRCRAFTS AND A METHOD OF ITS USE

FIELD OF THE INVENTION

The present invention generally relates to the field of charging systems for electric aircrafts. In particular, the present invention is directed to a recharging station for an electric aircraft and a method of its use.

BACKGROUND

Modern electric aircraft such as vertical takeoff and landing (eVTOL) aircrafts are limited in their range depending on their battery capacity. As such, electric aircrafts require charging stations to rapidly and reliably charge during trips. However modern electric vehicle charging stations put a great strain on electric power grids and cannot reliably and quickly receive power from these sources.

SUMMARY OF THE DISCLOSURE

In an aspect a recharging station for an electric aircraft including a landing pad, a rechargeable component mounted at an elevation below the landing pad, the rechargeable component comprising: a plurality of charging units wherein each charging unit is located at a predetermined spacing from one another, the charging unit of the plurality of charging units comprising: a charging connector configured to mate with a port of an electric aircraft, and a charging cable electronically connecting the charging connector and the power delivery unit, and a power delivery unit configured to deliver stored power from a power supply unit to the electric aircraft.

In an aspect, a method of charging an electric aircraft using an elevated landing pad including providing a landing pad, providing a rechargeable component mounted at an elevation below the landing pad, the rechargeable component comprising a charging unit of a plurality of charging units connected to a power delivery unit, connecting an electric aircraft on the landing pad to the rechargeable component, wherein connecting the electric aircraft comprises: retrieving a charging cable from a lower platform, ascending to the landing pad, and plugging in a charging connector of the charging cable to a port of an electric aircraft, and charging the electric aircraft with power delivered by the rechargeable component.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 7 is an exemplary embodiment of a cable reel module;

DETAILED DESCRIPTION

Figure 1:
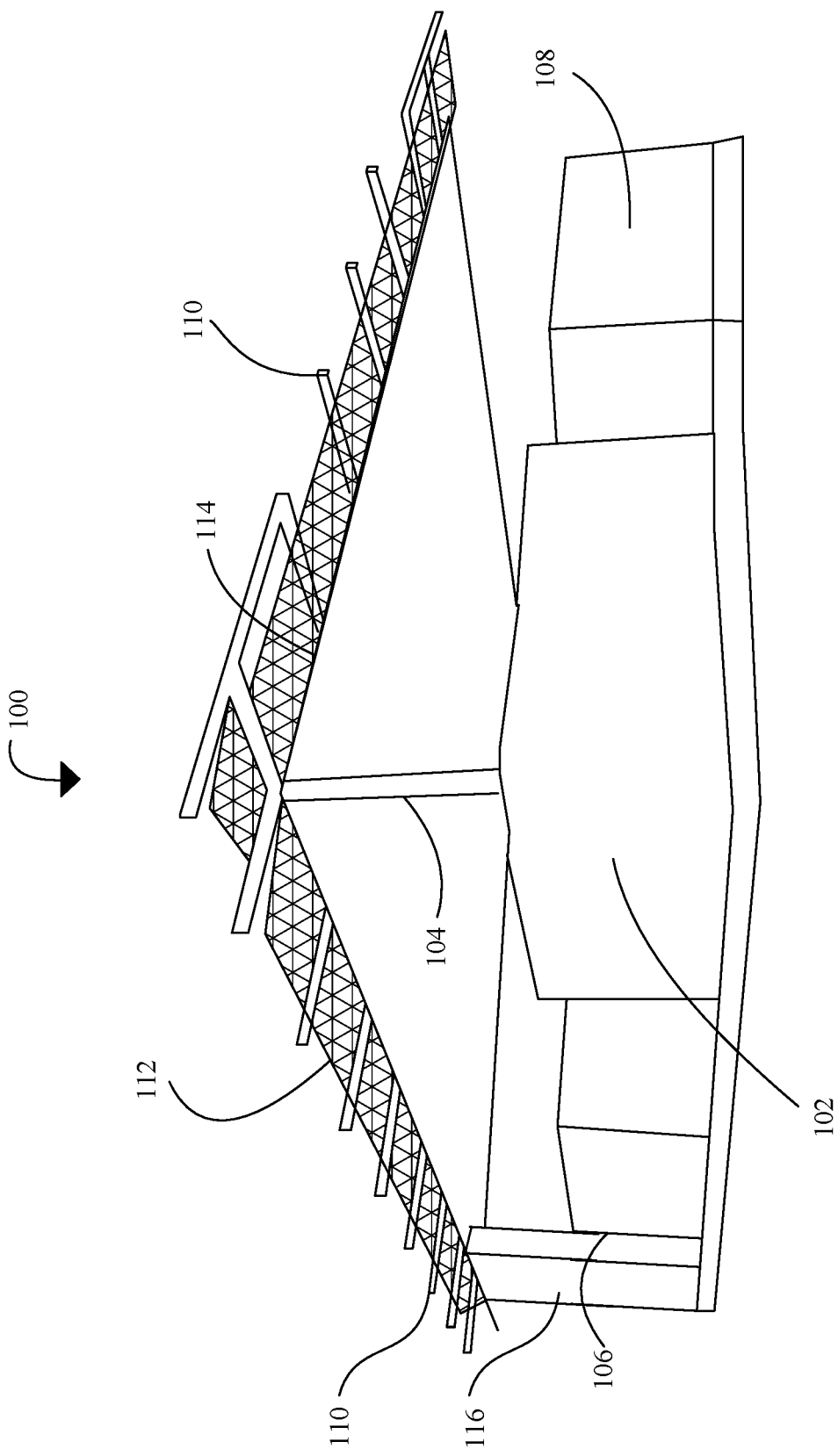
FIG. 1 is a side view of an exemplary embodiment of a recharging station.

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

Described herein is a system for a recharging station for an electric aircraft. In one embodiment, a station for recharging an electric aircraft may include an elevated landing pad, a recharging component coupled to the elevated landing pad, a power delivery unit configured to deliver power from a power supply unit or a power storage unit to the recharging component, and a support component coupled to the bottom of the elevated landing pad. In some embodiments, recharging component may include a trickle charger. In some embodiments, recharging component may include a plurality of charging units, such that an electric aircraft may use any of the plurality of charging units to recharge. It is advantageous to use a charging unit with a shorter length of charging cable to decrease power loss from the power supply unit. Additionally, the versatility of a plurality of charging units allows the electric aircraft to land in any orientation on the landing pad. In other embodiments, support component may include a hydraulic lift system configured to move one or more persons and cargo to the elevated landing pad. In some embodiments, elevated landing pad may include an integrated lighting system. An integrated lighting system of elevated landing pad may include light-emitting diodes (LEDs) with night vision goggle compatibility. In some embodiments, elevated landing pad may comprise a deicing system. In some embodiments, power supply unit may include a solar inverter for on-site power generation. In some embodiments, station may include a battery management system. In some embodiments, station may include a thermal management system. In another embodiment, recharging station may be configured to communicate data to and from an electric aircraft. In some embodiments, system may include a battery health monitoring system. In some embodiments, an electric aircraft to be used with station may include an eVTOL aircraft.

In some embodiments, recharging component may include a constant voltage charger, a constant current charger, a taper current charger, a pulsed current charger, a negative pulse charger, an IUI charger, a trickle charger and/or a float charger. In some embodiments, power delivery unit may be configured to deliver power stored from a power storage unit. In one embodiment, power storage unit may have a capacity of at least 500 kwh. In some embodiments, power delivery unit may be configured to connect to power storage unit through a DC-to-DC converter. In one embodiment, elevated landing pad may include an integrated lighting system. In some embodiments, integrated lighting system may include LEDs with night vision goggle compatibility. In one embodiment, elevated landing pad may include an integrated deicing system. In one embodiment, power delivery unit may be configured to connect to power storage unit through a DC-to-DC converter. In another embodiment, two or more electric aircrafts may be charged through the rechargeable component.

Referring now to FIG. 1, an exemplary embodiment of a recharging station 90 for recharging an electric aircraft is illustrated. As used in this disclosure an "aircraft" is a vehicle that may fly by gaining support from the air. As a non-limiting example, aircraft may include airplanes, helicopters, airships, blimps, gliders, paramotors, drones and the like thereof. In some embodiments, electric aircraft may be an electric vertical takeoff and landing (eVTOL) aircraft, for instance and without limitation as described in further detail below.

Continuing to refer to FIG. 1, an illustration of a recharging station 90 is shown. In some embodiments a recharging station 90 may be constructed from any of variety of suitable materials or any combination thereof. In some embodiments, recharging station 90 may be constructed from metal, concrete, polymers, or other durable materials. In one embodiment, recharging station 90 may be constructed from a lightweight metal alloy. In some embodiments, recharging station 90 may include a helideck or helipad In some embodiments, and with further reference to FIG. 1, recharging station 90 may be elevated above ground level. In one embodiment, recharging station 90 may be elevated at least 20 feet above ground level. In some embodiments, recharging station 90 may be elevated more than 20 feet above ground level.

In some embodiments, and still referring to FIG. 1, recharging station 90 may have a support component 92 coupled to landing pad 104. As used herein, a "support component" is a structure that bares the weight of the landing pad or anything else attached to/on the support component. In one embodiment, support component 92 may include a support column 94. As used herein, a "support column" is a structural member that supports the weight of components above the column. Support column 94 may be made from a variety of suitable materials, which may include without limitation any materials described above as suitable for the recharging station 90, to support one or more aircrafts on a landing pad 104. In some embodiments the support column 94 may be made from a lightweight metal alloy. In some embodiments, a support component 92 may be coupled to the landing pad 104. The support component 92 may be beneath the recharging station 90 to provide structural support and elevation. The support column 94 and/or support component 92 may be connected to the ground and/or to the landing pad 104. They may be connected through the use of mechanical components such as steel rebar, bolts, or the like. Support column 94/support component 92 may be connected to the ground and/or the landing pad 104 through the use of welding, or the like.

Continuing to refer to FIG. 1, landing pad 104 of recharging station 90 may have dimensions suitable for supporting various aircraft. In one embodiment, landing pad 104 may be at least 50 square feet in area. In other embodiments landing pad 104 may have an area of greater or less than 50 square feet. In some embodiments, landing pad 104 may be at least 1100 square feet in area. In some embodiments, landing pad 104 may accommodate an aircraft with a wingspan of 50 feet. In another embodiment, two or more recharging stations 90 may combine together for greater surface area of landing pad 104 to support more aircrafts.

In some embodiments, and continuing to refer to FIG. 1, the support component 92 may have a plurality of support columns 94. The recharging station 90 may also include supporting structures 100. As used herein, a "supporting structure" is a structure that supports auxiliary components. In an embodiment, auxiliary components may include rails along the edges of the landing pad 104, net meshing 102 that prevents objects from falling off the landing pad 104, and the like. Supporting structures 100 may provide additional structural support to the recharging station 90. Supporting structures 90 may have a net meshing 102. Net meshing 102 may include a variety of suitable materials. In one embodiment, net meshing 102 may include, without limitation, polyester, nylon, polypropylene, polyethylene, PVC and PTFE. Net meshing 102 may provide additional support to recharging station 90. Net meshing 102 may also act as a safety measure to prevent persons or cargo from falling off recharging station 90. Net meshing 102 may be attached to the supporting structures 100 of the recharging station 90 by mechanical components such as zip ties, ties made of the same material as the net meshing 102, screws, bolts, or the like.

In some embodiments, and with further reference to FIG. 1, support component 92 may include a plurality of modular housings 96. As used herein, "modular housing" are containers fabricated off-site that can be used as any sort of housing. Modular housings 96 may be configured based on the needs of a mission or location. For example, modular housings 96 may contain a hotel container for the pilot and flight crew to rest in. In one embodiment, a hotel container may include a bed, bathroom, shower, and integrated water heaters. In another embodiment, the modular housings 96 may have a control room for pilots and flight crew to relax, eat, study, and plan their next mission.

In another embodiment, and still referring to FIG. 1, a unit of a modular housings 96 may include an electrical power supply 98. As used herein, an "electrical power supply" is an electrical device that stores power. Electrical power supply may include an electrical storage unit such as a battery storage unit. The battery storage unit may contain batteries, a solar inverter, a power grid component, and power distribution panels. Any component of electrical power supply, including electrical storage may include, be included in, share components with, and/or be implemented according to any other electrical power supplies, storage units, or the like as described in this disclosure. In some embodiments, support component 92 may also act as a modular housing unit, such that the modular housing unit provides support for the recharging station 90. In one embodiment, the plurality of modular housings of a support component 92 may enable quick construction and deconstruction of a recharging station 90. In one embodiment, a support component 92 may be constructed on top of one or more buildings. In another embodiment, a support component 92 may be constructed in a remote location. In one embodiment, one of the modular housings of support component 92 may have a hotel container. The hotel container may include a bed, a bathroom, a shower, and a sink. In some embodiments, the hotel container may also serve as a storage unit for freshwater, gray water, and blackwater. In other embodiments, the hotel container may serve as a storage unit for a plumbing system. In some embodiments, a plumbing system may be integrated throughout support component 92. In one embodiment, a plumbing system may include integrated water heaters. In some embodiments, support component 92 may be configured to connect to a surrounding plumbing system. In some embodiments, support component 92 may be configured to connect to a surrounding sewage system. In other embodiments, support component 92 may be configured to connect to a septic tank system.

In some embodiments, and continuing to refer to FIG. 1, recharging station 90 may include a power supply unit such as a power storage unit 98. The power supply unit may have electrical components that may be configured to receive electrical power, which may include alternating current ("AC") and/or direct current ("DC") power, and output DC and/or AC power in a useable voltage, current, and/or frequency. In one embodiment, the power supply unit may include a power storage unit 98. The power storage unit 98 may be configured to store 500 kwh of electrical energy. In another embodiment, power storage unit 98 may be configured to store more than 500 kwh of electrical energy. Power storage unit 98 may house a variety of electrical components. In one embodiment, power storage unit 98 may contain a solar inverter. The solar inverter may be configured to produce on-site power generation. In one embodiment, the power generated from the solar inverter may be stored in power storage unit 98. In some embodiments, power storage unit 98 may include a used electric aircraft battery pack no longer fit for flight. Battery pack may be implemented, without limitation, as described in further detail with regard to FIG. 4 below.

Still referring to FIG. 1, in some embodiments, the support component 92 may have a hydraulic lift system 106. In one embodiment, the hydraulic lift system 106 may be configured to ascend or descend one or more persons and cargo to the recharging station 90.

Figure 2:
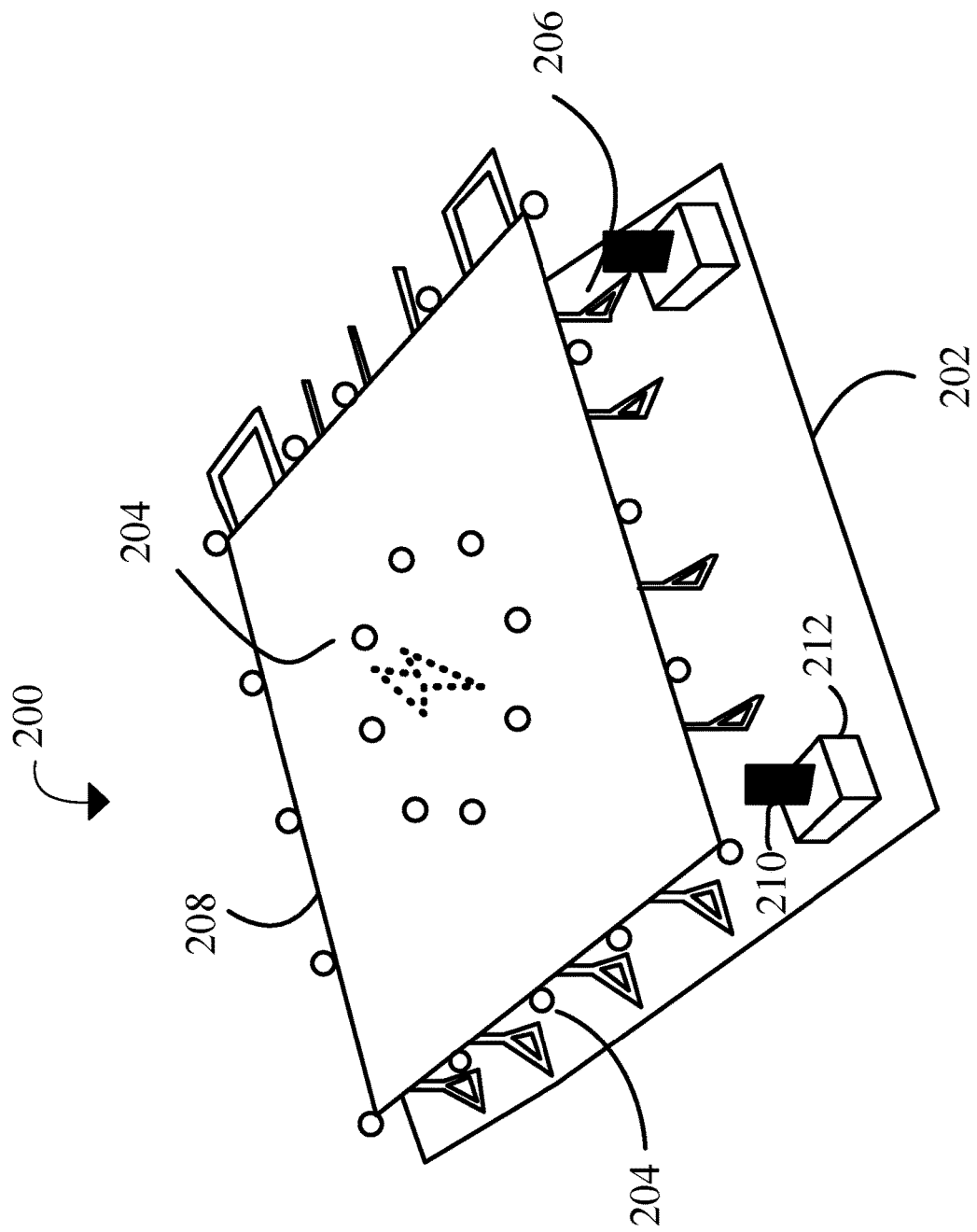
FIG. 2 is a top view of an exemplary embodiment of a recharging station.

FIG. 2 illustrates a top view of an embodiment of a recharging station 200. In one embodiment, recharging station 200 may include an integrated lighting system 204. In one embodiment, the integrated lighting system may include a plurality of light sources 204, such as fluorescent, OLED, incandescent, halogen, metal halide, neon, high intensity discharge, low pressure sodium, and LEDS 204. In one embodiment, light sources 204 may be green. In one embodiment, light sources 204 of the integrated lighting system may include night vision compatibility. In one embodiment, light sources 204 may be able to change colors. In another embodiment, light sources 204 may be configured to switch on and off in a pattern to signal to aircraft various messages, such as a SOS message.

In some embodiments, recharging station 200 may have an integrated deicing system. The integrated deicing system may be configured to keep landing pad 208 free of weather obstruction such as snow, ice, sleet, or hail. In one embodiment, recharging station 200 may have supporting structures 206. Supporting structures 206 may be configured to support one or more electric aircrafts on recharging station 200. Supporting structures 206 may be consistent with support columns 94 discussed in FIG. 1. In one embodiment, landing pad 208 may have a support base 202. Support base 202 may be configured to be wider than landing pad 208. Support base 202 may be 5%, 9%, 15%, etc. wider than the landing pad 208. Support base 202 may be below the landing pad 208, such that supporting structures 206 are between the support base 202 and the landing pad 208. In an embodiment, if support columns of supporting structures 206 is 20 feet tall, then the support base 202 is 20 feet below the landing pad 208. Support base 202 may also provide a foundation for other supporting components such as modular units. Support base may be bolted to, screwed to, connected with steel rebar to, the supporting structures 206, which are also mechanically connected to the landing pad 208. In another embodiment, support base 202 may have an integrated heating and lighting system.

Continuing to refer to FIG. 2, recharging station 200 may include a rechargeable component that includes a plurality of charging units 210. Rechargeable component may be mounted at an elevation below the landing pad 208. Plurality of charging units may be mounted below the landing pad 208. As used in this disclosure, a "charging unit" is a device used to charge and/or recharge an electric aircraft. The charging units 210 may be mounted to support base 202 below the landing pad 208. Charging unit 210 may be mounted to a platform 212 that is then mounted to the support base 202, in ways as discussed above, such as with bolts, rebar, screws, adhesives, or the like. Platform 212 may elevate charging units from the ground. Platform 212 may be 1 foot, 5 inches, 2 feet, or the like. In some cases, the charging units 210 may be mounted at a height above the landing pad 208. For example, and without limitation, the height may be 1 inch, 2 inches, 6 inches, 1 foot, 3 feet, or the like above or below the landing pad 208. In some embodiments, the charging system may be preferably mounted at a height of 2 feet below the landing pad 208. Additionally, the plurality of charging units 210 may be arranged such that the spacing between the charging units 210 may be such to maximize the space distribution between adjacent charging units 210. For example, if there are four charging units 210, the charging units 210 may be arranged in a square or rhombus configuration with each charging unit at a corner of the square or rhombus. Rechargeable component may include 2, 4, 7, or the like charging units 210. Charging units 210 may be placed on either side of the recharging station 200. Charging units 210 may be placed at the center of each side of the recharging station 200. Charging units 210 may be placed on the corner of each side of the recharging station 200, shown in FIG. 2 (two charging units are hidden behind the depiction of the landing pad 208). A charging unit of the plurality of charging units 210 includes a charging connector and a charging cable. Charging cable may connect the charging connector and the power delivery unit. Rechargeable component may also include a power delivery unit, which may supply power to the charging unit and ultimately the electric aircraft via the charging cable. Each charging cable may electrically connect respective power units and charging connectors such that a particular charging unit of the plurality of charging units may be selected for charging (or recharging) the electric aircraft. Each charging unit may be connected to a specific power supply unit such that there are equal amounts of power supply units and charging units. Alternatively, or additionally, charging units may share power supply units such that there are less power supply units than charging units.

Figure 11:
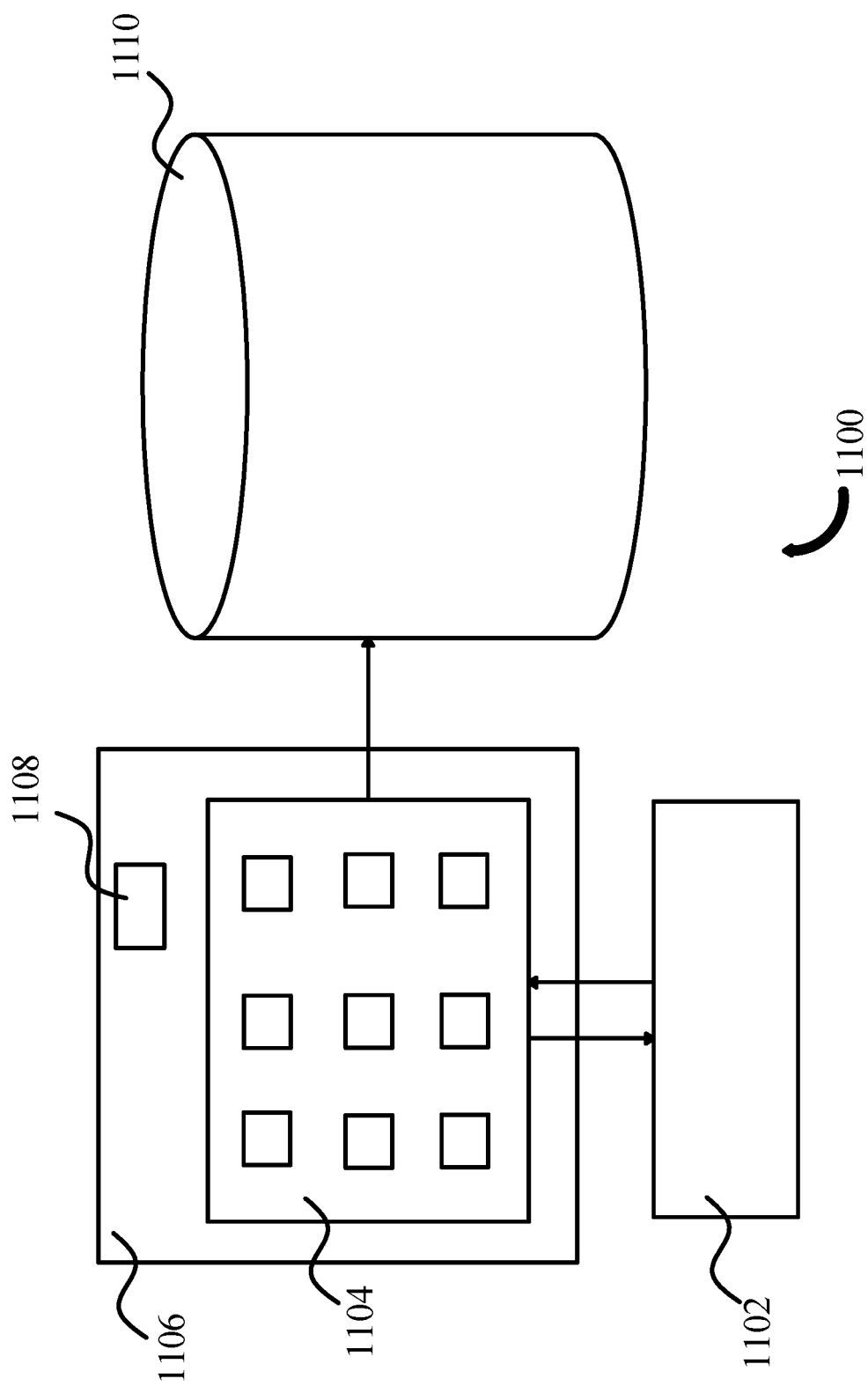
FIG. 11 is a flow diagram illustrating an exemplary embodiment of a computing system

Charging cables are discussed in further detail in FIG. 11. Charging connectors are discussed in further detail in FIG. 12.

Figure 3:
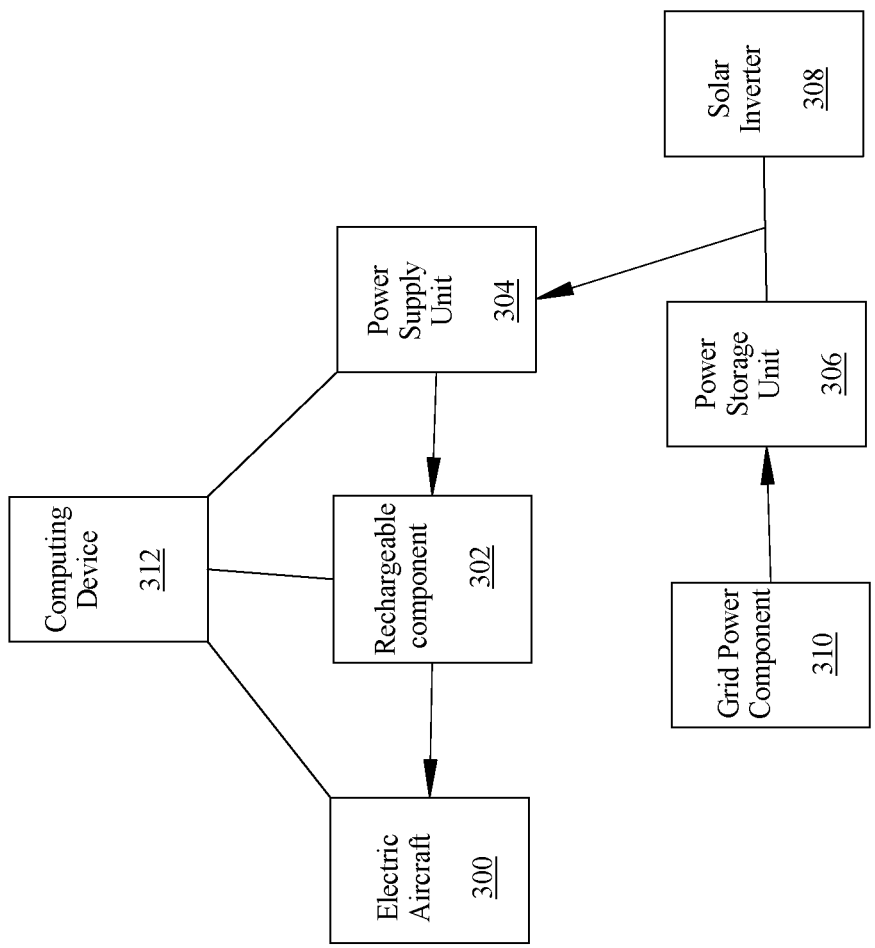
FIG. 3 is a block diagram of an exemplary embodiment of a recharging system.

FIG. 3 illustrates a block diagram of an electrical system for recharging an electric aircraft, which may, without limitation, be incorporated in station 90. In one embodiment, an electric aircraft 300 may be electrically coupled to a rechargeable component 302 of station 90. Electric aircraft 300 may be charged through a charging connector attached to the recharge component 302 by a cable reel. Recharge component 302 may also include a charging unit that houses the charging cable, cable reel, and charging connector. Charging unit may transfer power from the power delivery unit to the charging connector and ultimately the electric aircraft. Rechargeable component 302 may have a plurality of connections to comply with various electric air vehicle needs. Connectors for charging an electric aircraft is discussed in further detail in FIG. 12. In one embodiment, rechargeable component 302 may connect to manned and unmanned electric aircrafts of various sizes, such as an EVTOL or a drone. In another embodiment, rechargeable component 302 may switch between power transfer standards such as the combined charging system standard (CCS) and CHAdeMO standards. In another embodiment, rechargeable component 302 may adapt to multiple demand response interfaces. In one embodiment, rechargeable component 302 may have ADR 2.0 as a demand response interface.

In some embodiments, and still referring to FIG. 3, rechargeable component 302 may have a continuous power rating of at least 350 kVA. In other embodiments, the rechargeable component 302 may have a continuous power rating of over 350 kVA. In some embodiments, rechargeable component 302 may have a battery charge range up to 850 Vdc. In other embodiments, rechargeable component 302 may have a battery charge range of over 850 Vdc. In some embodiments, rechargeable component 302 may have a continuous charge current of at least 350 amps. In other embodiments, rechargeable component 302 may have a continuous charge current of over 350 amps. In some embodiments, rechargeable component 302 may have a boost charge current of at least 500 amps. In other embodiments, rechargeable component 302 may have a boost charge current of over 500 amps. In some embodiments, rechargeable component 302 may include any component with the capability of recharging an energy source of the electric aircraft 300. In some embodiments, rechargeable component 302 may include a constant voltage charger, a constant current charger, a taper current charger, a pulsed current charger, a negative pulse charger, an IUI charger, a trickle charger, and a float charger.

In some embodiments, charging units of the rechargeable component 302 may receive power from a power supply unit 304. In an embodiment, charging units may all receive power from one or more power supply units. There may be a 1:1 ratio of charging units and power supply units. Power supply unit 304 may have a DC-to-DC converter to convert power into a variety of voltages for rechargeable component 302. Power supply unit 304 may actively switch between multiple power sources. In one embodiment, power supply unit 304 may switch between power from a power storage unit 306 and power from a solar inverter 308. In one embodiment, solar inverter 308 may be configured to absorb solar energy and transform the solar energy into electrical energy. In one embodiment, solar inverter 308 may transform DC to AC. In some embodiments, solar inverter 308 may have a capacity of at least 250 kwh. In other embodiments, solar inverter 308 may have a capacity higher than 250 kwh. In some embodiments, solar inverter 308 may include a solar panel, electrical grade papers, films, coated cloths, laminates, insulation tape, lead pads, and phase separators. Solar inverters may be consistent with any solar inverter as disclosed in U.S. patent application Ser. No. 17/373,863 entitled "SYSTEM FOR CHARGING FROM AN ELECTRIC VEHICLE CHARGER TO AN ELECTRIC GRID" and filed on Jul. 12, 2021.

In some embodiments, power supply unit 304 may receive power from the power storage unit 306. Power storage unit 306 may include one or more batteries, capacitors, inductors, or other electrical power storing components. In one embodiment, power supply unit 304 may include repurposed electric aircraft batteries. In some embodiments, power storage unit 306 may have a capacity of at least 500 kwh. In another embodiment, power storage 306 may have a capacity of over 500 kwh. In some embodiments, power storage unit 306 may have a connection to grid power component 310. Grid power component 310 may be connected to an external electrical power grid. In some embodiments, grid power component 310 may be configured to slowly charge one or more batteries in power storage unit 306 in order to reduce strain on nearby electrical power grids. In one embodiment, grid power component 310 may have an AC grid current of at least 450 amps. In some embodiments, grid power component 310 may have an AC grid current of more or less than 450 amps. In one embodiment, grid power component 310 may have an AC voltage connection of 480 Vac. In other embodiments, grid power component 310 may have an AC voltage connection of above or below 480 Vac. In some embodiments, power supply storage unit 306 may provide power to the grid power component 310. In this configuration, power storage unit 306 may provide power to a surrounding electrical power grid.

In some embodiments, and still referring to FIG. 3, system 300 may include a computing device 312. Computing device 312 may include any computing device as described in this disclosure, including without limitation a microcontroller, microprocessor, digital signal processor (DSP) and/or system on a chip (SoC) as described in this disclosure. Computing device 312 may include, be included in, and/or communicate with a mobile device such as a mobile telephone or smartphone. Computing device 312 may include a single computing device operating independently, or may include two or more computing device operating in concert, in parallel, sequentially or the like; two or more computing devices may be included together in a single computing device or in two or more computing devices. Computing device 312 may interface or communicate with one or more additional devices as described below in further detail via a network interface device. Network interface device may be utilized for connecting computing device 312 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus, or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 312 may include but is not limited to, for example, a computing device or cluster of computing devices in a first location and a second computing device or cluster of computing devices in a second location. Computing device 312 may include one or more computing devices dedicated to data storage, security, distribution of traffic for load balancing, and the like. Computing device 312 may distribute one or more computing tasks as described below across a plurality of computing devices of computing device, which may operate in parallel, in series, redundantly, or in any other manner used for distribution of tasks or memory between computing devices. Computing device 312 may be implemented using a "shared nothing" architecture in which data is cached at the worker, in an embodiment, this may enable scalability of apparatus 90 and/or computing device.

With continued reference to FIG. 3, computing device 312 may be designed and/or configured to perform any method, method step, or sequence of method steps in any embodiment described in this disclosure, in any order and with any degree of repetition. For instance, computing device 312 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 312 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, computing device 312 may monitor a power grid of the power recharging station and actively switch between charging electric aircraft 300 and charging one or more batteries in power storage unit 306. In one embodiment, computing device 312 may monitor the power grid of the recharging station as well as an external power grid. Computing device 312 may route power from power storage unit 306 to an external power grid to power said external power grid. In some embodiments, computing device 312 may be connected to electric aircraft 300 physically or wirelessly. In some embodiments, computing device 312 may be connected to rechargeable component 302 and power supply unit 304. Computing device 312 may monitor the power grid of the recharging station and its various electrical components. Computing device 312 may be configured to perform a variety of functions and procedures.

In some embodiments, the computing device 312 may assist with electric aircraft 300 by helping to guide electric aircraft 300 to a landing pad. Advantageously, because of the plurality of charging units located on the landing pad, electric aircraft may have flexibility in landing orientation.

In one embodiment, computing device 312 may make and send a landing plan to electric aircraft 300. In another embodiment, computing device 312 may receive landing data from electric aircraft 300 and instruct rechargeable component 310 and power supply unit 304 to power up in anticipation of charging electric aircraft 300. In some embodiments, computing device 312 may receive a battery status from electric aircraft 300, either or both while charging the electric aircraft 300 and while electric aircraft 300 is in the air. Computing device 312 may also receive and report health and damage status of electric aircraft 300. In some embodiments, computing device 312 may send estimated charge times and health and status of rechargeable component 302 to electric aircraft 300. In some embodiments, computing device 312 may also include a temperature sensor. Computing device 312 may use the temperature data gathered from the temperature sensor to track the heating and cooling of rechargeable component 302 and electric aircraft 300. In one embodiment, computing device 312 may coordinate the cooling of electric aircraft 300 to prevent it from overheating in various scenarios, such as being charged. In some embodiments, computing device 312 may be configured to monitor and track the state of health of the batteries, which is discussed in further detail with regards to FIG. 7 below.

In some embodiments, computing device 312 may send flight plans to electric aircraft 300. In some embodiments, this may occur while electric aircraft 300 is connected and charging through rechargeable component 302. In other embodiments, computing device 312 may send flight plans to electric aircraft 300 while it is airborne. In some embodiments, the flight plans may be real-time and updated based on, but not limited to, battery status of electric aircraft 300, battery and health status of rechargeable component 302, charge times, weather conditions, and travel times. In some embodiments, computing device 312 may send flight plans and other flight information to another recharging station. Computing device 312 may communicate between two or more recharging stations to create an efficient flight plan and charging plan for electric aircraft 300. In some embodiments, computing device 312 may send software and firmware updates to electric aircraft 300. Electric aircraft 300 may similarly request software and firmware updates from computing device 312. Computing device 312 may also update the software and firmware of rechargeable component 302. In some embodiments, the status of the firmware and software updates of electric aircraft 300 and rechargeable component 302 may be reported by computing device 312. In some embodiments, computing device 312 may update the software and firmware of individual components of electric aircraft 300.

In some embodiments, computing device 312 may transfer many forms of data to and from electric aircraft 300, either wired or wirelessly. These forms of data may include, but are not limited to, flight plan updates, software updates, firmware updates, flight records, charge data, weather data, traffic data, or other data, as described in detail below in FIG. 9.

Figure 4:
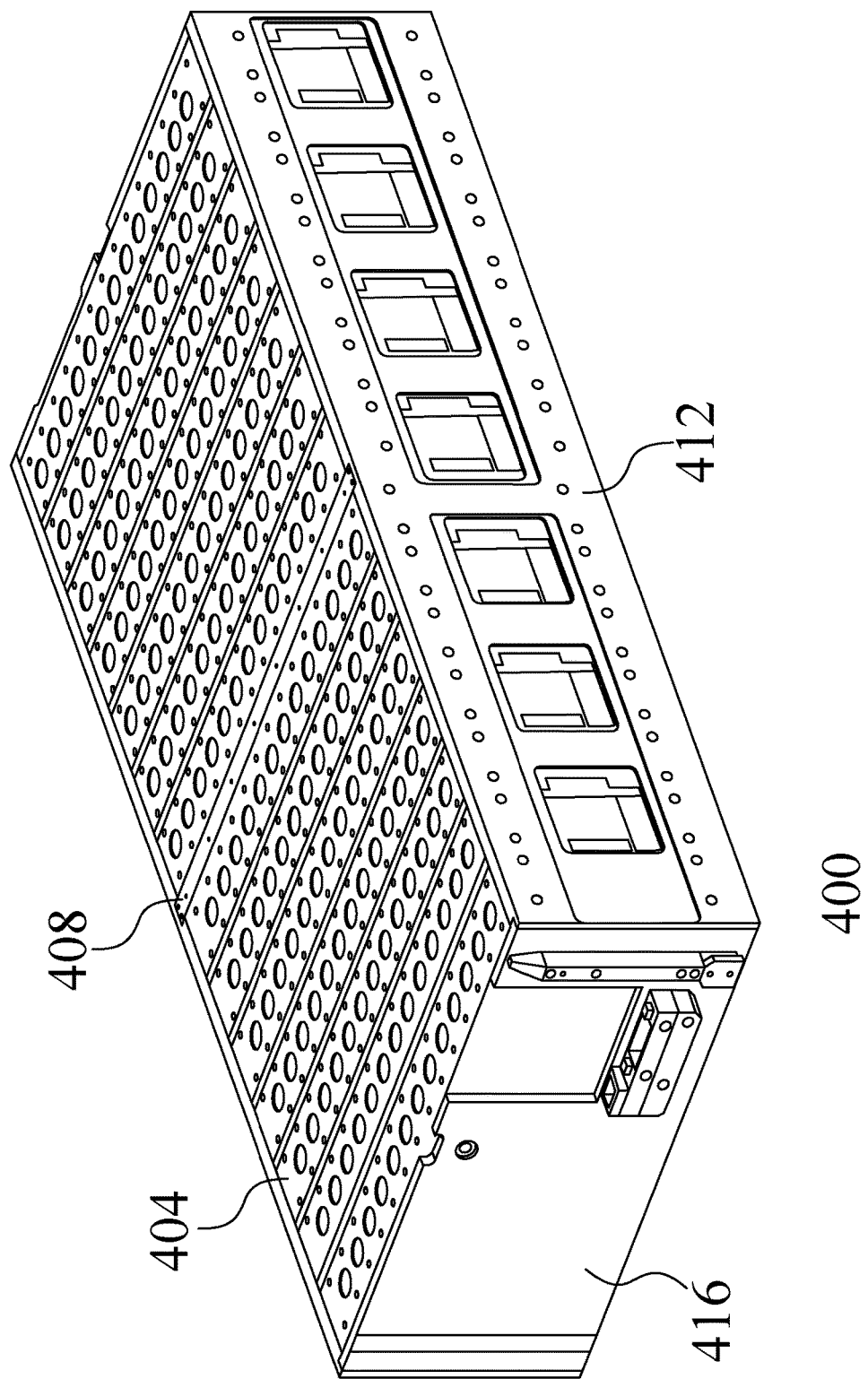
FIG. 4 is a front view of an exemplary embodiment of a battery pack.

FIG. 4 illustrates an exemplary embodiment of a battery pack 400 that may be housed in the power storage unit to store power. Battery pack 400 may be a power storing device that is configured to store electrical energy in the form of a plurality of battery modules, which themselves may be comprised of a plurality of electrochemical cells. These cells may utilize electrochemical cells, galvanic cells, electrolytic cells, fuel cells, flow cells, and/or voltaic cells. In general, an electrochemical cell is a device capable of generating electrical energy from chemical reactions or using electrical energy to cause chemical reactions. Voltaic or galvanic cells are electrochemical cells that generate electric current from chemical reactions, while electrolytic cells generate chemical reactions via electrolysis. In general, the term 'battery' is used as a collection of cells connected in series or parallel to each other. A battery cell may, when used in conjunction with other cells, be electrically connected in series, in parallel or a combination of series and parallel. Series connection comprises wiring a first terminal of a first cell to a second terminal of a second cell and further configured to comprise a single conductive path for electricity to flow while maintaining the same current (measured in Amperes) through any component in the circuit. A battery cell may use the term 'wired', but one of ordinary skill in the art would appreciate that this term is synonymous with 'electrically connected', and that there are many ways to couple electrical elements like battery cells together. An example of a connector that does not comprise wires may be prefabricated terminals of a first gender that mate with a second terminal with a second gender. Battery cells may be wired in parallel. Parallel connection comprises wiring a first and second terminal of a first battery cell to a first and second terminal of a second battery cell and further configured to comprise more than one conductive path for electricity to flow while maintaining the same voltage (measured in Volts) across any component in the circuit. Battery cells may be wired in a series-parallel circuit which combines characteristics of the constituent circuit types to this combination circuit. Battery cells may be electrically connected in a virtually unlimited arrangement which may confer onto the system the electrical advantages associated with that arrangement such as high-voltage applications, high-current applications, or the like. In an exemplary embodiment, battery pack 400 may include at least 196 battery cells in series and at least 18 battery cells in parallel. This is, as someone of ordinary skill in the art would appreciate, only an example and battery pack 400 may be configured to have a near limitless arrangement of battery cell configurations.

With continued reference to FIG. 4, battery pack 400 may include a plurality of battery modules 404. The battery modules may be wired together in series and in parallel. Battery pack 400 may include a center sheet 408 which may include a thin barrier. The barrier may include a fuse connecting battery modules on either side of center sheet 408. The fuse may be disposed in or on center sheet 408 and configured to connect to an electric circuit comprising a first battery module and therefore battery unit and cells. In general, and for the purposes of this disclosure, a fuse is an electrical safety device that operate to provide overcurrent protection of an electrical circuit. As a sacrificial device, its essential component is metal wire or strip that melts when too much current flows through it, thereby interrupting energy flow. The fuse may comprise a thermal fuse, mechanical fuse, blade fuse, expulsion fuse, spark gap surge arrestor, varistor, or a combination thereof.

Battery pack 400 may also include a side wall 412 which may include a laminate of a plurality of layers configured to thermally insulate the plurality of battery modules 404 from external components of battery pack 400. Side wall 412 layers may include materials which possess characteristics suitable for thermal insulation such as fiberglass, air, iron fibers, polystyrene foam, and thin plastic films. Side wall 412 may additionally or alternatively electrically insulate the plurality of battery modules 404 from external components of battery pack 400 and the layers of which may include polyvinyl chloride (PVC), glass, asbestos, rigid laminate, varnish, resin, paper, Teflon, rubber, and mechanical lamina. Center sheet 408 may be mechanically coupled to side wall 412. Side wall 412 may include a feature for alignment and coupling to center sheet 408. This feature may comprise a cutout, slots, holes, bosses, ridges, channels, and/or other undisclosed mechanical features, alone or in combination.

Battery pack 400 may also include an end panel 416 having a plurality of electrical connectors and further configured to fix battery pack 400 in alignment with at least a side wall 412. End panel 416 may include a plurality of electrical connectors of a first gender configured to electrically and mechanically couple to electrical connectors of a second gender. End panel 416 may be configured to convey electrical energy from battery cells to at least a portion of an eVTOL aircraft. Electrical energy may be configured to power at least a portion of an eVTOL aircraft or comprise signals to notify aircraft computers, personnel, users, pilots, and any others of information regarding battery health, emergencies, and/or electrical characteristics. The plurality of electrical connectors may comprise blind mate connectors, plug and socket connectors, screw terminals, ring and spade connectors, blade connectors, and/or an undisclosed type alone or in combination. The electrical connectors of which end panel 416 comprises may be configured for power and communication purposes.

A first end of end panel 416 may be configured to mechanically couple to a first end of a first side wall 412 by a snap attachment mechanism, similar to end cap and side panel configuration utilized in the battery module. To reiterate, a protrusion disposed in or on end panel 416 may be captured, at least in part, by a receptacle disposed in or on side wall 412. A second end of end panel 416 may be mechanically coupled to a second end of a second side wall 412 in a similar or the same mechanism.

Figure 5:
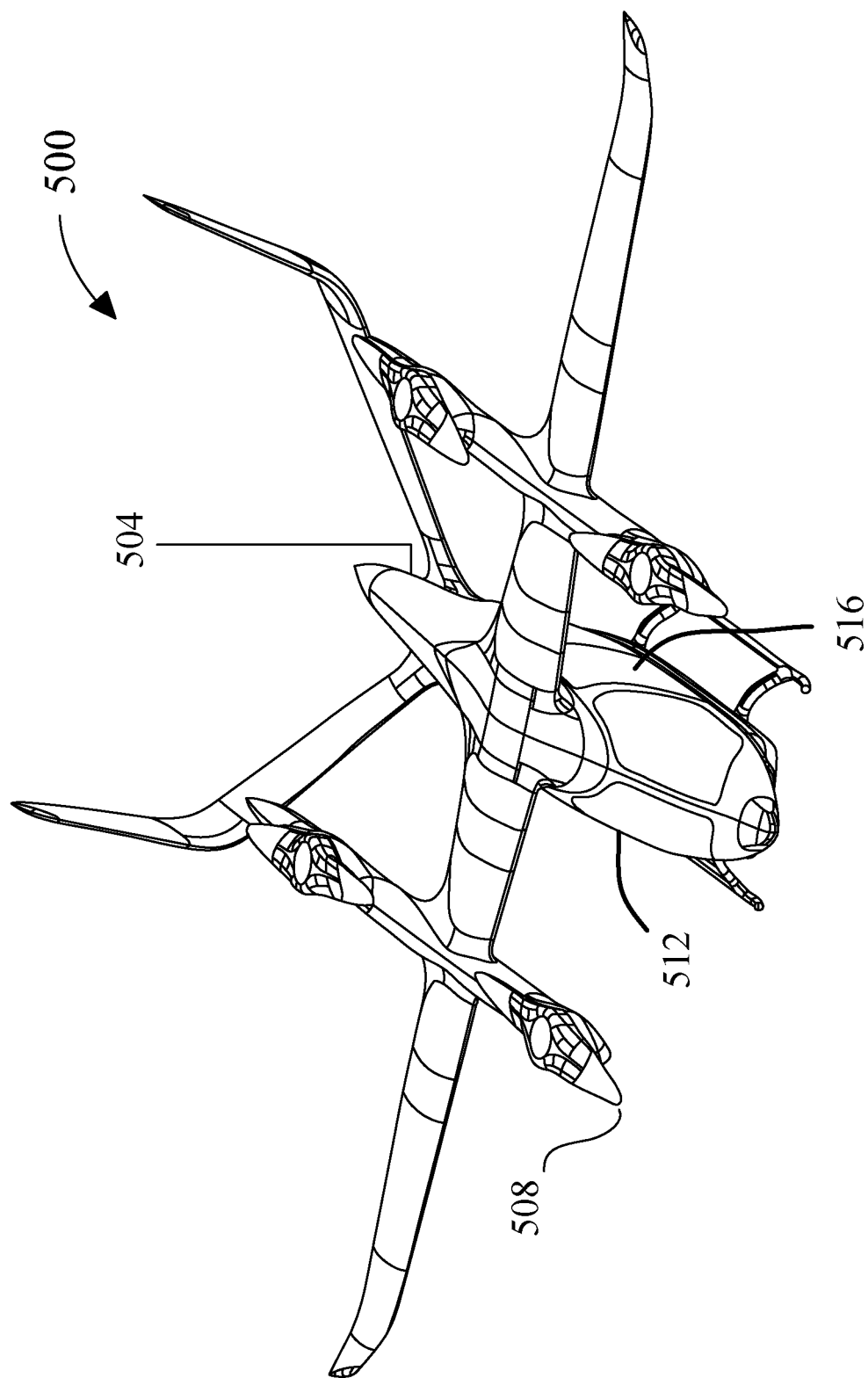
FIG. 5 is a front view of an exemplary embodiment of an eVTOL.

Referring now to FIG. 5, an embodiment of an electric aircraft 700 is presented. Electric aircraft 700 may be configured to be positioned on the recharging station. In some embodiments, electric aircraft 700 may be configured to receive power and be charged by the recharging station. Electric aircraft 700 may include a vertical takeoff and landing aircraft (eVTOL). As used herein, a vertical take-off and landing (eVTOL) aircraft is one that may hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

With continued reference to FIG. 5, a number of aerodynamic forces may act upon the electric aircraft 700 during flight. Forces acting on an electric aircraft 700 during flight may include, without limitation, thrust, the forward force produced by the rotating element of the electric aircraft 700 and acts parallel to the longitudinal axis. Another force acting upon electric aircraft 700 may be, without limitation, drag, which may be defined as a rearward retarding force which is caused by disruption of airflow by any protruding surface of the electric aircraft 700 such as, without limitation, the wing, rotor, and fuselage. Drag may oppose thrust and acts rearward parallel to the relative wind. A further force acting upon electric aircraft 700 may include, without limitation, weight, which may include a combined load of the electric aircraft 700 itself, crew, baggage, and/or fuel. Weight may pull electric aircraft 700 downward due to the force of gravity. An additional force acting on electric aircraft 700 may include, without limitation, lift, which may act to oppose the downward force of weight and may be produced by the dynamic effect of air acting on the airfoil and/or downward thrust from the propulsor of the electric aircraft. Lift generated by the airfoil may depend on speed of airflow, density of air, total area of an airfoil and/or segment thereof, and/or an angle of attack between air and the airfoil. For example, and without limitation, electric aircraft 700 are designed to be as lightweight as possible. Reducing the weight of the aircraft and designing to reduce the number of components is essential to optimize the weight. To save energy, it may be useful to reduce weight of components of an electric aircraft 700, including without limitation propulsors and/or propulsion assemblies. In an embodiment, the motor may eliminate need for many external structural features that otherwise might be needed to join one component to another component. The motor may also increase energy efficiency by enabling a lower physical propulsor profile, reducing drag and/or wind resistance. This may also increase durability by lessening the extent to which drag and/or wind resistance add to forces acting on electric aircraft 700 and/or propulsors.

Referring still to FIG. 5, Aircraft may include at least a vertical propulsor 504 and at least a forward propulsor 508. A forward propulsor is a propulsor that propels the aircraft in a forward direction. Forward in this context is not an indication of the propulsor position on the aircraft; one or more propulsors mounted on the front, on the wings, at the rear, etc. A vertical propulsor is a propulsor that propels the aircraft in an upward direction; one of more vertical propulsors may be mounted on the front, on the wings, at the rear, and/or any suitable location. A propulsor, as used herein, is a component or device used to propel a craft by exerting force on a fluid medium, which may include a gaseous medium such as air or a liquid medium such as water. At least a vertical propulsor 504 is a propulsor that generates a substantially downward thrust, tending to propel an aircraft in a vertical direction providing thrust for maneuvers such as without limitation, vertical take-off, vertical landing, hovering, and/or rotor-based flight such as "quadcopter" or similar styles of flight.

With continued reference to FIG. 5, at least a forward propulsor 508 as used in this disclosure is a propulsor positioned for propelling an aircraft in a "forward" direction; at least a forward propulsor may include one or more propulsors mounted on the front, on the wings, at the rear, or a combination of any such positions. At least a forward propulsor may propel an aircraft forward for fixed-wing and/or "airplane"-style flight, takeoff, and/or landing, and/or may propel the aircraft forward or backward on the ground. At least a vertical propulsor 504 and at least a forward propulsor 508 includes a thrust element. At least a thrust element may include any device or component that converts the mechanical energy of a motor, for instance in the form of rotational motion of a shaft, into thrust in a fluid medium. At least a thrust element may include, without limitation, a device using moving or rotating foils, including without limitation one or more rotors, an airscrew or propeller, a set of airscrews or propellers such as contrarotating propellers, a moving or flapping wing, or the like. At least a thrust element may include without limitation a marine propeller or screw, an impeller, a turbine, a pump-jet, a paddle or paddle-based device, or the like. As another non-limiting example, at least a thrust element may include an eight-bladed pusher propeller, such as an eight-bladed propeller mounted behind the engine to ensure the drive shaft is in compression. Propulsors may include at least a motor mechanically coupled to the at least a first propulsor as a source of thrust. A motor may include without limitation, any electric motor, where an electric motor is a device that converts electrical energy into mechanical energy, for instance by causing a shaft to rotate. At least a motor may be driven by direct current (DC) electric power; for instance, at least a first motor may include a brushed DC at least a first motor, or the like. At least a first motor may be driven by electric power having varying or reversing voltage levels, such as alternating current (AC) power as produced by an alternating current generator and/or inverter, or otherwise varying power, such as produced by a switching power source. At least a first motor may include, without limitation, brushless DC electric motors, permanent magnet synchronous at least a first motor, switched reluctance motors, or induction motors. In addition to inverter and/or a switching power source, a circuit driving at least a first motor may include electronic speed controllers or other components for regulating motor speed, rotation direction, and/or dynamic braking. Persons skilled in the art, upon reviewing the entirety of this disclosure, will be aware of various devices that may be used as at least a thrust element.

With continued reference to FIG. 5, during flight, a number of forces may act upon the electric aircraft. Forces acting on an aircraft 700 during flight may include thrust, the forward force produced by the rotating element of the aircraft 700 and acts parallel to the longitudinal axis. Drag may be defined as a rearward retarding force which is caused by disruption of airflow by any protruding surface of the aircraft 700 such as, without limitation, the wing, rotor, and fuselage. Drag may oppose thrust and acts rearward parallel to the relative wind. Another force acting on aircraft 700 may include weight, which may include a combined load of the aircraft 700 itself, crew, baggage and fuel. Weight may pull aircraft 700 downward due to the force of gravity. An additional force acting on aircraft 700 may include lift, which may act to oppose the downward force of weight and may be produced by the dynamic effect of air acting on the airfoil and/or downward thrust from at least a propulsor. Lift generated by the airfoil may depends on speed of airflow, density of air, total area of an airfoil and/or segment thereof, and/or an angle of attack between air and the airfoil.

With continued reference to FIG. 5, aircraft 700 includes a port 512 configured to mate with a charging connector of apparatus 200. Port may be a female connector that connects to the male connector of the charging connector. Alternatively, port may be a male connector that the female connector of the charging connector mates to. Port may match the geometry of the charging connector. Port of the electric aircraft may be located on an opposite side of the electric aircraft from the passenger egress 516. As used herein, a "passenger egress" is an opening on an aircraft where passengers may exit. In an embodiment, if charging port is located on the right side of the aircraft, the passenger egress may be located on the left side. The opposite side orientation may allow for the aircraft to be charged and the passengers to leave the aircraft at the same time.

Figure 6:
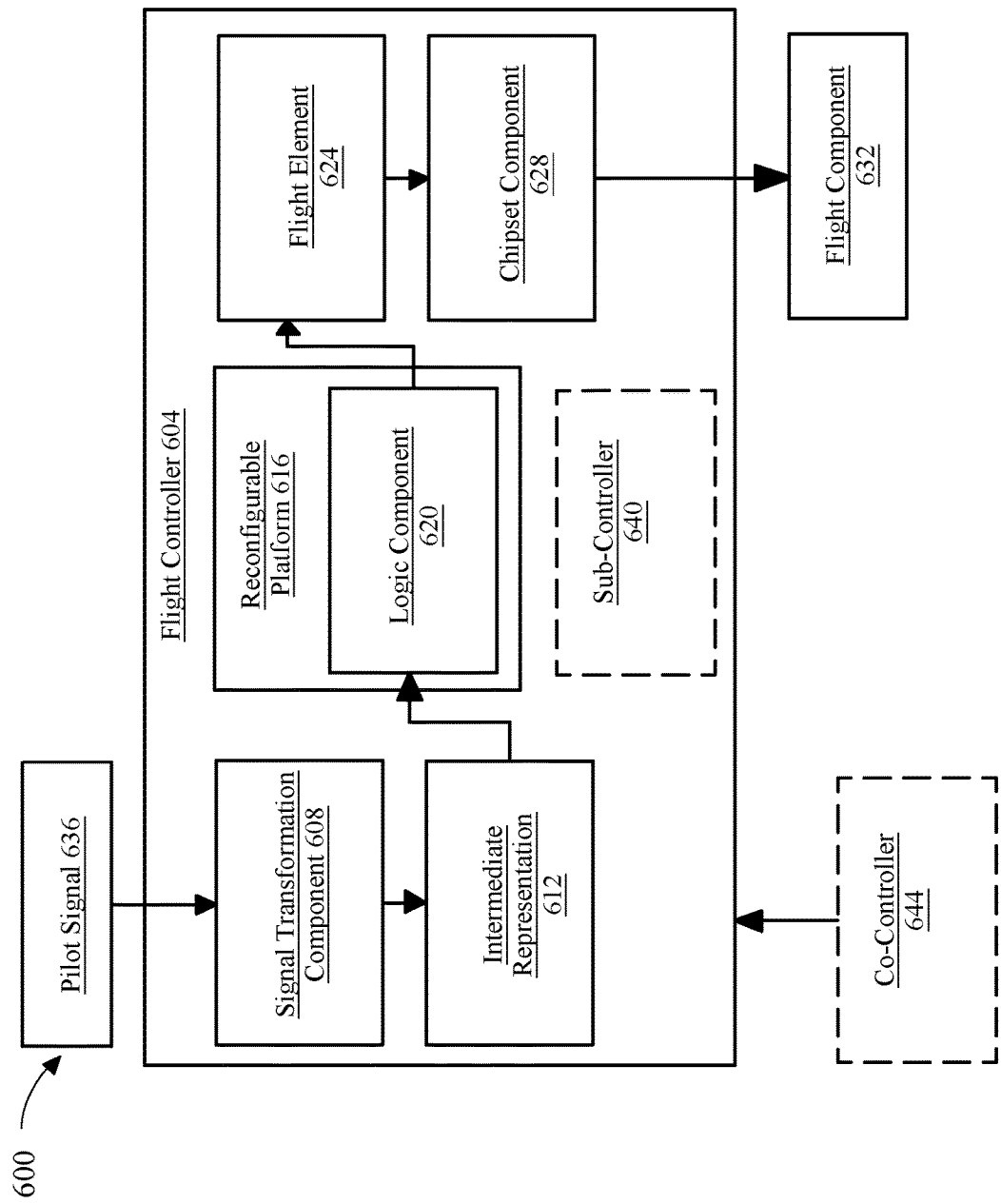
FIG. 6 is a flowchart of illustrating an exemplary embodiment of a flight controller system.

Now referring to FIG. 6, an exemplary embodiment 600 of a flight controller 604 is illustrated. As used in this disclosure a "flight controller" is a computing device of a plurality of computing devices dedicated to data storage, security, distribution of traffic for load balancing, and flight instruction. Flight controller 604 may include and/or communicate with any computing device as described in this disclosure, including without limitation a microcontroller, microprocessor, digital signal processor (DSP) and/or system on a chip (SoC) as described in this disclosure. Further, flight controller 604 may include a single computing device operating independently, or may include two or more computing device operating in concert, in parallel, sequentially or the like; two or more computing devices may be included together in a single computing device or in two or more computing devices. In embodiments, flight controller 604 may be installed in an aircraft, may control the aircraft remotely, and/or may include an element installed in the aircraft and a remote element in communication therewith.

In an embodiment, and still referring to FIG. 6, flight controller 604 may include a signal transformation component 608. As used in this disclosure a "signal transformation component" is a component that transforms and/or converts a first signal to a second signal, wherein a signal may include one or more digital and/or analog signals. For example, and without limitation, signal transformation component 608 may be configured to perform one or more operations such as preprocessing, lexical analysis, parsing, semantic analysis, and the like thereof. In an embodiment, and without limitation, signal transformation component 608 may include one or more analog-to-digital convertors that transform a first signal of an analog signal to a second signal of a digital signal. For example, and without limitation, an analog-to-digital converter may convert an analog input signal to a 9-bit binary digital representation of that signal. In another embodiment, signal transformation component 608 may include transforming one or more low-level languages such as, but not limited to, machine languages and/or assembly languages. For example, and without limitation, signal transformation component 608 may include transforming a binary language signal to an assembly language signal. In an embodiment, and without limitation, signal transformation component 608 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 6, signal transformation component 608 may be configured to optimize an intermediate representation 612. As used in this disclosure an "intermediate representation" is a data structure and/or code that represents the input signal. Signal transformation component 608 may optimize intermediate representation as a function of a data-flow analysis, dependence analysis, alias analysis, pointer analysis, escape analysis, and the like thereof. In an embodiment, and without limitation, signal transformation component 608 may optimize intermediate representation 612 as a function of one or more inline expansions, dead code eliminations, constant propagation, loop transformations, and/or automatic parallelization functions. In another embodiment, signal transformation component 608 may optimize intermediate representation as a function of a machine dependent optimization such as a peephole optimization, wherein a peephole optimization may rewrite short sequences of code into more efficient sequences of code. Signal transformation component 608 may optimize intermediate representation to generate an output language, wherein an "output language," as used herein, is the native machine language of flight controller 604. For example, and without limitation, native machine language may include one or more binary and/or numerical languages.

In an embodiment, and without limitation, signal transformation component 608 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of $(q-k-1)/2$ erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 6, flight controller 604 may include a reconfigurable hardware platform 616. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 616 may be reconfigured to enact any algorithm and/or algorithm selection process received from another computing device and/or created using machine-learning processes.

Still referring to FIG. 6, reconfigurable hardware platform 616 may include a logic component 620. As used in this disclosure a "logic component" is a component that executes instructions on output language. For example, and without limitation, logic component may perform basic arithmetic, logic, controlling, input/output operations, and the like thereof. Logic component 620 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 620 may be organized according to Von Neumann and/or Harvard architecture as a non-limiting example. Logic component 620 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC). In an embodiment, logic component 620 may include one or more integrated circuit microprocessors, which may contain one or more central processing units, central processors, and/or main processors, on a single metal-oxide-semiconductor chip. Logic component 620 may be configured to execute a sequence of stored instructions to be performed on the output language and/or intermediate representation 612. Logic component 620 may be configured to fetch and/or retrieve the instruction from a memory cache, wherein a "memory cache," as used in this disclosure, is a stored instruction set on flight controller 604. Logic component 620 may be configured to decode the instruction retrieved from the memory cache to opcodes and/or operands. Logic component 620 may be configured to execute the instruction on intermediate representation 612 and/or output language. For example, and without limitation, logic component 620 may be configured to execute an addition operation on intermediate representation 612 and/or output language.

In an embodiment, and without limitation, logic component 620 may be configured to calculate a flight element 624. As used in this disclosure a "flight element" is an element of datum denoting a relative status of aircraft. For example, and without limitation, flight element 624 may denote one or more torques, thrusts, airspeed velocities, forces, altitudes, groundspeed velocities, directions during flight, directions facing, forces, orientations, and the like thereof. For example, and without limitation, flight element 624 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 624 may denote that aircraft is following a flight path accurately and/or sufficiently.

Still referring to FIG. 6, flight controller 604 may include a chipset component 628. As used in this disclosure a "chipset component" is a component that manages data flow. In an embodiment, and without limitation, chipset component 628 may include a northbridge data flow path, wherein the northbridge dataflow path may manage data flow from logic component 620 to a high-speed device and/or component, such as a RAM, graphics controller, and the like thereof. In another embodiment, and without limitation, chipset component 628 may include a southbridge data flow path, wherein the southbridge dataflow path may manage data flow from logic component 620 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally, or alternatively, chipset component 628 may manage data flow between logic component 620, memory cache, and a flight component 632. As used in this disclosure a "flight component" is a portion of an aircraft that may be moved or adjusted to affect one or more flight elements. For example, flight component 632 may include a component used to affect the aircrafts' roll and pitch which may comprise one or more ailerons. As a further example, flight component 632 may include a rudder to control yaw of an aircraft. In an embodiment, chipset component 628 may be configured to communicate with a plurality of flight components as a function of flight element 624. For example, and without limitation, chipset component 628 may transmit to an aircraft rotor to reduce torque of a first lift propulsor and increase the forward thrust produced by a pusher component to perform a flight maneuver.

In an embodiment, and still referring to FIG. 6, flight controller 604 may be configured generate an autonomous function. As used in this disclosure an "autonomous function" is a mode and/or function of flight controller 604 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 624. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 604 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 604 will control the ailerons and/or rudders. As used in this disclosure "non-autonomous mode" is a mode that denotes a pilot will control aircraft and/or maneuvers of aircraft in its entirety.

In an embodiment, and still referring to FIG. 6, flight controller 604 may generate autonomous function as a function of an autonomous machine-learning model. As used in this disclosure an "autonomous machine-learning model" is a machine-learning model to produce an autonomous function output given flight element 624 and a pilot signal 636 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 636 may denote that a pilot is controlling and/or maneuvering ailerons, wherein the pilot is not in control of the rudders and/or propulsors. In an embodiment, pilot signal 636 may include an implicit signal and/or an explicit signal. For example, and without limitation, pilot signal 636 may include an explicit signal, wherein the pilot explicitly states there is a lack of control and/or desire for autonomous function. As a further non-limiting example, pilot signal 636 may include an explicit signal directing flight controller 604 to control and/or maintain a portion of aircraft, a portion of the flight plan, the entire aircraft, and/or the entire flight plan. As a further non-limiting example, pilot signal 636 may include an implicit signal, wherein flight controller 604 detects a lack of control such as by a malfunction, torque alteration, flight path deviation, and the like thereof. In an embodiment, and without limitation, pilot signal 636 may include one or more explicit signals to reduce torque, and/or one or more implicit signals that torque may be reduced due to reduction of airspeed velocity. In an embodiment, and without limitation, pilot signal 636 may include one or more local and/or global signals. For example, and without limitation, pilot signal 636 may include a local signal that is transmitted by a pilot and/or crew member. As a further non-limiting example, pilot signal 636 may include a global signal that is transmitted by air traffic control and/or one or more remote users that are in communication with the pilot of aircraft. In an embodiment, pilot signal 636 may be received as a function of a tri-state bus and/or multiplexor that denotes an explicit pilot signal should be transmitted prior to any implicit or global pilot signal.

Still referring to FIG. 6, autonomous machine-learning model may include one or more autonomous machine-learning processes such as supervised, unsupervised, or reinforcement machine-learning processes that flight controller 604 and/or a remote device may or may not use in the generation of autonomous function. As used in this disclosure "remote device" is an external device to flight controller 604. Additionally, or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 6, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 604 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 6, flight controller 604 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 604. Remote device and/or FPGA may transmit a signal, bit, datum, or parameter to flight controller 604 that at least relates to autonomous function. Additionally, or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example, a software update may incorporate a new simulation data that relates to a modified flight element. Additionally, or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 604 as a software update, firmware update, or corrected habit machine-learning model. For example, and without limitation autonomous machine learning model may utilize a neural net machine-learning process, wherein the updated machine-learning model may incorporate a gradient boosting machine-learning process.

Still referring to FIG. 6, flight controller 604 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and may employ a wired and/or a wireless mode of communication.

In an embodiment, and still referring to FIG. 6, flight controller 604 may include, but is not limited to, for example, a cluster of flight controllers in a first location and a second flight controller or cluster of flight controllers in a second location. Flight controller 604 may include one or more flight controllers dedicated to data storage, security, distribution of traffic for load balancing, and the like. Flight controller 604 may be configured to distribute one or more computing tasks as described below across a plurality of flight controllers, which may operate in parallel, in series, redundantly, or in any other manner used for distribution of tasks or memory between computing devices. For example, and without limitation, flight controller 604 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Mass., USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 6, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 632. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 6, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 604. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example, and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 612 and/or output language from logic component 620, wherein output language may include one or more analog-to-digital conversions, low bit rate transmissions, message encryptions, digital signals, binary signals, logic signals, analog signals, and the like thereof described above in detail.

Still referring to FIG. 6, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 6, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 6, flight controller 604 may also be implemented using a "shared nothing" architecture in which data is cached at the worker, in an embodiment, this may enable scalability of aircraft and/or computing device. Flight controller 604 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 6, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally, or alternatively, a bias b may be added to the weighted sum of the inputs such that an offset is added to each unit in the neural network layer that is independent of the input to the layer. The weighted sum may then be input into a function co, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one or more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 6, flight controller may include a sub-controller 640. As used in this disclosure a "sub-controller" is a controller and/or component that is part of a distributed controller as described above; for instance, flight controller 604 may be and/or include a distributed flight controller made up of one or more sub-controllers. For example, and without limitation, sub-controller 640 may include any controllers and/or components thereof that are similar to distributed flight controller and/or flight controller as described above. Sub-controller 640 may include any component of any flight controller as described above. Sub-controller 640 may be implemented in any manner suitable for implementation of a flight controller as described above. As a further non-limiting example, sub-controller 640 may include one or more processors, logic components and/or computing devices capable of receiving, processing, and/or transmitting data across the distributed flight controller as described above. As a further non-limiting example, sub-controller 640 may include a controller that receives a signal from a first flight controller and/or first distributed flight controller component and transmits the signal to a plurality of additional sub-controllers and/or flight components.

Still referring to FIG. 6, flight controller may include a co-controller 644. As used in this disclosure a "co-controller" is a controller and/or component that joins flight controller 604 as components and/or nodes of a distributer flight controller as described above. For example, and without limitation, co-controller 644 may include one or more controllers and/or components that are similar to flight controller 604. As a further non-limiting example, co-controller 644 may include any controller and/or component that joins flight controller 604 to distributer flight controller. As a further non-limiting example, co-controller 644 may include one or more processors, logic components and/or computing devices capable of receiving, processing, and/or transmitting data to and/or from flight controller 604 to distributed flight control system. Co-controller 644 may include any component of any flight controller as described above. Co-controller 644 may be implemented in any manner suitable for implementation of a flight controller as described above.

In an embodiment, and with continued reference to FIG. 6, flight controller 604 may be designed and/or configured to perform any method, method step, or sequence of method steps in any embodiment described in this disclosure, in any order and with any degree of repetition. For instance, flight controller 604 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

In some embodiments, and with continued reference to FIG. 6, any data, software, and/or firmware that may be usable/storable by flight controller 604 may be exchanged with the recharging station. In some embodiments, the data exchanged may include flight plans, flight records, current navigational status, and/or commands from the recharging station. In some embodiments, the commands from the recharging station may include commands to alter, steer, or navigate an electric aircraft. In other embodiments, the data exchanged between flight controller 604 and the recharging station may include a battery state of an electric aircraft. In some embodiments, the battery state may be tracked by any battery management system as described above.

Figure 7:
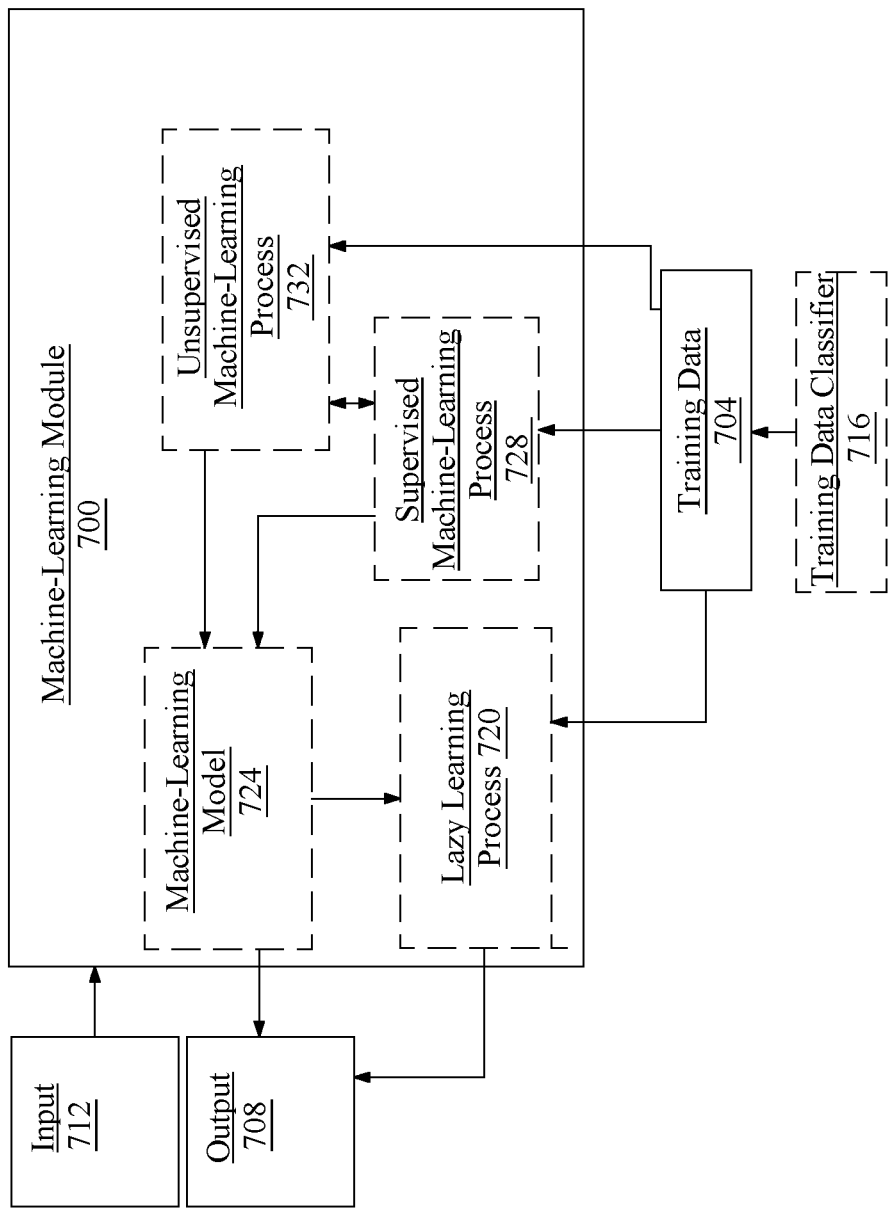
FIG. 7 is a flowchart of an exemplary machine learning module.

Referring now to FIG. 7, an exemplary embodiment of a machine-learning module 700 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 704 to generate an algorithm that will be performed by a computing device/module to produce outputs 708 given data provided as inputs 712; this is in contrast to a non-machine learning software program where the commands to be executed are determined in advance by a user and written in a programming language.

Still referring to FIG. 7, "training data," as used herein, is data containing correlations that a machine-learning process may use to model relationships between two or more categories of data elements. For instance, and without limitation, training data 704 may include a plurality of data entries, each entry representing a set of data elements that were recorded, received, and/or generated together; data elements may be correlated by shared existence in a given data entry, by proximity in a given data entry, or the like. Multiple data entries in training data 704 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 704 according to various correlations; correlations may indicate causative and/or predictive links between categories of data elements, which may be modeled as relationships such as mathematical relationships by machine-learning processes as described in further detail below. Training data 704 may be formatted and/or organized by categories of data elements, for instance by associating data elements with one or more descriptors corresponding to categories of data elements. As a non-limiting example, training data 704 may include data entered in standardized forms by persons or processes, such that entry of a given data element in a given field in a form may be mapped to one or more descriptors of categories. Elements in training data 704 may be linked to descriptors of categories by tags, tokens, or other data elements; for instance, and without limitation, training data 704 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively, or additionally, and continuing to refer to FIG. 7, training data 704 may include one or more elements that are not categorized; that is, training data 704 may not be formatted or contain descriptors for some elements of data. Machine-learning algorithms and/or other processes may sort training data 704 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 704 to be made applicable for two or more distinct machine-learning algorithms as described in further detail below. Training data 704 used by machine-learning module 700 may correlate any input data as described in this disclosure to any output data as described in this disclosure. As a non-limiting illustrative example flight elements and/or pilot signals may be inputs, wherein an output may be an autonomous function.

Further referring to FIG. 7, training data may be filtered, sorted, and/or selected using one or more supervised and/or unsupervised machine-learning processes and/or models as described in further detail below; such models may include without limitation a training data classifier 716. Training data classifier 716 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 700 may generate a classifier using a classification algorithm, defined as a process whereby a computing device and/or any module and/or component operating thereon derives a classifier from training data 704. Classification may be performed using, without limitation, linear classifiers such as without limitation logistic regression and/or naive Bayes classifiers, nearest neighbor classifiers such as k-nearest neighbors' classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 716 may classify elements of training data to sub-categories of flight elements such as torques, forces, thrusts, directions, and the like thereof.

Still referring to FIG. 7, machine-learning module 700 may be configured to perform a lazy-learning process 720 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 704. Heuristic may include selecting some number of highest-ranking associations and/or training data 704 elements. Lazy learning may implement any suitable lazy learning algorithm, including without limitation a K-nearest neighbors' algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively, or additionally, and with continued reference to FIG. 7, machine-learning processes as described in this disclosure may be used to generate machine-learning models 724. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 724 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 724 may be generated by creating an artificial neural network, such as a convolutional neural network comprising an input layer of nodes, one or more intermediate layers, and an output layer of nodes. Connections between nodes may be created via the process of "training" the network, in which elements from a training data 704 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 7, machine-learning algorithms may include at least a supervised machine-learning process 728. At least a supervised machine-learning process 728, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 704. Persons skilled in the art, upon reviewing the entirety of this disclosure, will be aware of various possible variations of at least a supervised machine-learning process 728 that may be used to determine relation between inputs and outputs. Supervised machine-learning processes may include classification algorithms as defined above.

Further referring to FIG. 7, machine learning processes may include at least an unsupervised machine-learning processes 732. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 7, machine-learning module 700 may be designed and configured to create a machine-learning model 724 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 7, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors' algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 8:
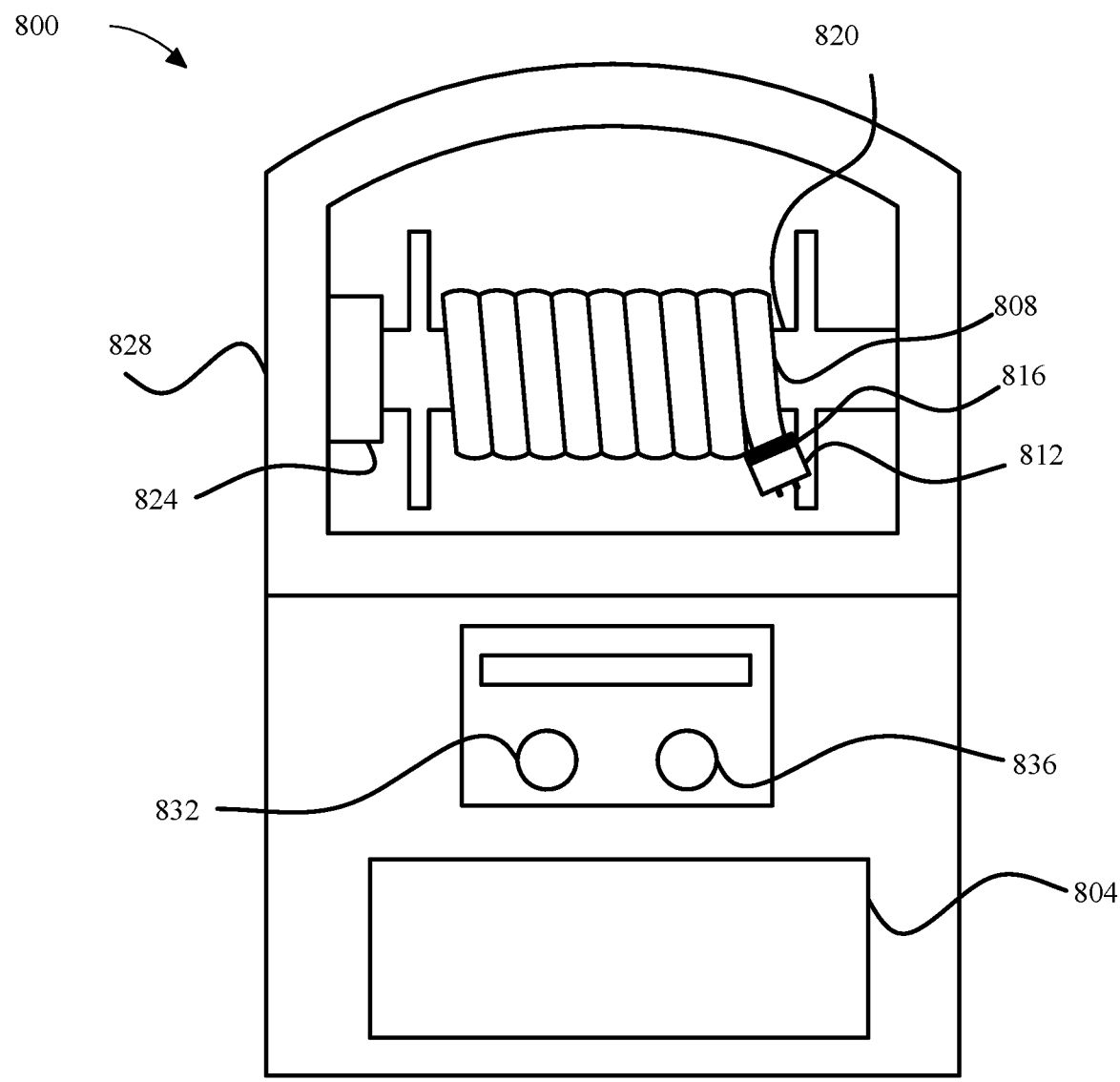
FIG. 8 is an exemplary embodiment of a connector for charging an electric aircraft.

Now referring to FIG. 8, an exemplary embodiment of a cable reel module 800. Cable reel module is included in the recharging component 302. Cable reel module may facilitate the power transfer from the power delivery unit to the electric aircraft through a charging connector 812, discussed in FIG. 9. Power delivery unit may be configured to deliver power stored from a power storage unit 306 or a solar inverter 308. Power storage unit 306 and solar inverter 308 may supply power to a power supply unit 304 wherein the power supply unit 304 may supply power to the aircraft 300 through the charging connector 812 connected to a cable reel module 800. The cable reel module 800 may include a reel 820. For the purposes of this disclosure, "a cable reel module" is the portion of a charging system containing a reel, that houses a charging cable 808 when charging cable 808 is stowed. For the purposes of this disclosure, a "reel" is a rotary device around which an object may be wrapped. Reel 820 is rotatably mounted to cable reel module 800. For the purposes of this disclosure, "rotatably mounted" means mounted such that the mounted object may rotate with respect to the object that the mounted object is mounted on. Additionally, when charging cable 808 is in a stowed configuration, the charging cable 808 is wound around reel 820. As a non-limiting example, charging cable 808 is in the stowed configuration in FIG. 8. In the stowed configuration, charging cable 808 need not be completely wound around reel 820. As a non-limiting example, a portion of charging cable 808 may hang free from reel 820 even when charging cable 808 is in the stowed configuration.

With continued reference to FIG. 8, cable reel module 800 includes a rotation mechanism 824. A "rotation mechanism," for the purposes of this disclosure is a mechanism that is configured to cause another object to undergo rotary motion. As a non-limiting example, rotation mechanism may include a rotary actuator. As a non-limiting example, rotation mechanism 824 may include an electric motor. As another non-limiting example, rotation mechanism 824 may include a servomotor. As yet another non-limiting example, rotation mechanism 824 may include a stepper motor. In some embodiments, rotation mechanism 824 may include a compliant element. For the purposes of this disclosure, a "compliant element" is an element that creates force through elastic deformation. As a non-limiting example, rotation mechanism 824 may include a torsional spring, wherein the torsional spring may elastically deform when reel 820 is rotated in, for example, the forward direction; this would cause the torsional spring to exert torque on reel 820, causing reel 820 to rotate in a reverse direction when it has been released. Rotation mechanism 824 is configured to rotate reel 820 in a forward direction and a reverse direction. Forward direction and reverse direction are opposite directions of rotation. As a non-limiting example, the forward direction may be clockwise, whereas the reverse direction may be counterclockwise, or vice versa. As a non-limiting example, rotating in the forward direction may cause charging cable 808 to extend, whereas rotating in the reverse direction may cause charging cable 808 to stow, or vice versa. In some embodiments, rotation mechanism 824 may continually rotate reel 820 when rotation mechanism 824 is enabled. In some embodiments, rotation mechanism 824 may be configured to rotate reel 820 by a specific number of degrees. In some embodiments, rotation mechanism 824 may be configured to output a specific torque to reel 820. As a non-limiting example, this may be the case, wherein rotation mechanism 824 is a torque motor. Rotation mechanism 824 may be electrically connected to energy source 804. Energy source 804 may be connected to power supply unit 304 such that the energy source 804 may draw energy from the power supply unit 304. Rotation mechanism 824 may be activated by a toggle 832 located on the cable reel module 800. A toggle may be a button that a user may press to activate the rotation of the rotation mechanism 824. In some embodiments, the reel may be configured to unspool the charging cable 808 in response to tension on the charging cable 808. For example, the charging cable 808 may unspool when a user pulls on the charging cable 808.

With continued reference to FIG. 8, cable reel module 800 may include an outer case 828. Outer case 828 may enclose reel 820 and rotation mechanism 824. In some embodiments, outer case 828 may enclose charging cable 808 and possibly charging connector 812 when the charging cable 808 is in its stowed configuration.

With continued reference to FIG. 8, cable reel module 800 may include a slip ring 816. Slip ring 816 may be attached to the charging cable 808 and the charging connector 812, both of which are discussed in further detail below. Slip ring 816 may be positioned in between the charging cable 808 and the charging connector 812 such that the charging connector 812 may rotate freely relative to the charging cable 808. As used in this disclosure, a "slip ring" is an electromechanical device that carries a current from a stationary wire into a rotating device. As used in this disclosure, a "current" is any movement of particles within a substance. For example, a current may be a flow of electrons or a flow of a liquid through a pipe. In an embodiment, slip ring 816 may allow the flow of a coolant and a flow of electrons from the free moving charging connector 812 to the stationary charging cable 808. Slip ring 816 may allow a user to position the charging connector 812 in any position to charge the electric aircraft 300. In another embodiment, slip ring 816 may also hold wires that allow for low-power communication signals between the charging connector 812 and the charging cable 808. In another embodiment, slip ring 816 may hold a low-voltage conductor configured to potential no greater than 90 V. Low-voltage conductors may be used to power auxiliary equipment while aircraft is on the ground.

With continued reference to FIG. 8, cable reel module 800 may include a charging cable 808. A "charging cable," for the purposes of this disclosure is a conductor or conductors adapted to carry power for the purpose of charging an electronic device. Charging cable 808 may also include an embedded coolant tube 1204, shown in FIG. 9. In an embodiment, cable reel module may run a coolant through the coolant tube in the charging cable 808 to charge the electric aircraft more quickly. Coolant tube may facilitate the flow of coolant through a coolant flow path. Coolant may assist in rapid charging by cooling down the electrical components within the aircraft 300 and the charging cable 808. Charging cable 808 may be configured to carry electricity. Charging cable 808 is electrically connected to the power supply unit 304. "Electrically connected," for the purposes of this disclosure, means a connection such that electricity can be transferred over the connection. In some embodiments, charging cable 808 may carry AC and/or DC power to a charging connector 812. The charging cable may include a coating, wherein the coating surrounds the conductor or conductors of charging cable 808. One of ordinary skill in the art, after having reviewed the entirety of this disclosure, would appreciate that a variety of coatings are suitable for use in charging cable 808. As a non-limiting example, the coating of charging cable 808 may comprise rubber. As another non-limiting example, the coating of charging cable 808 may comprise nylon. Charging cable 808 may be a variety of lengths depending on the length required by the specific implementation. As a non-limiting example, charging cable 808 may be 9 feet. As another non-limiting example, charging cable 808 may be 25 feet. As yet another non-limiting example, charging cable 808 may be 50 feet.

Figure 9:
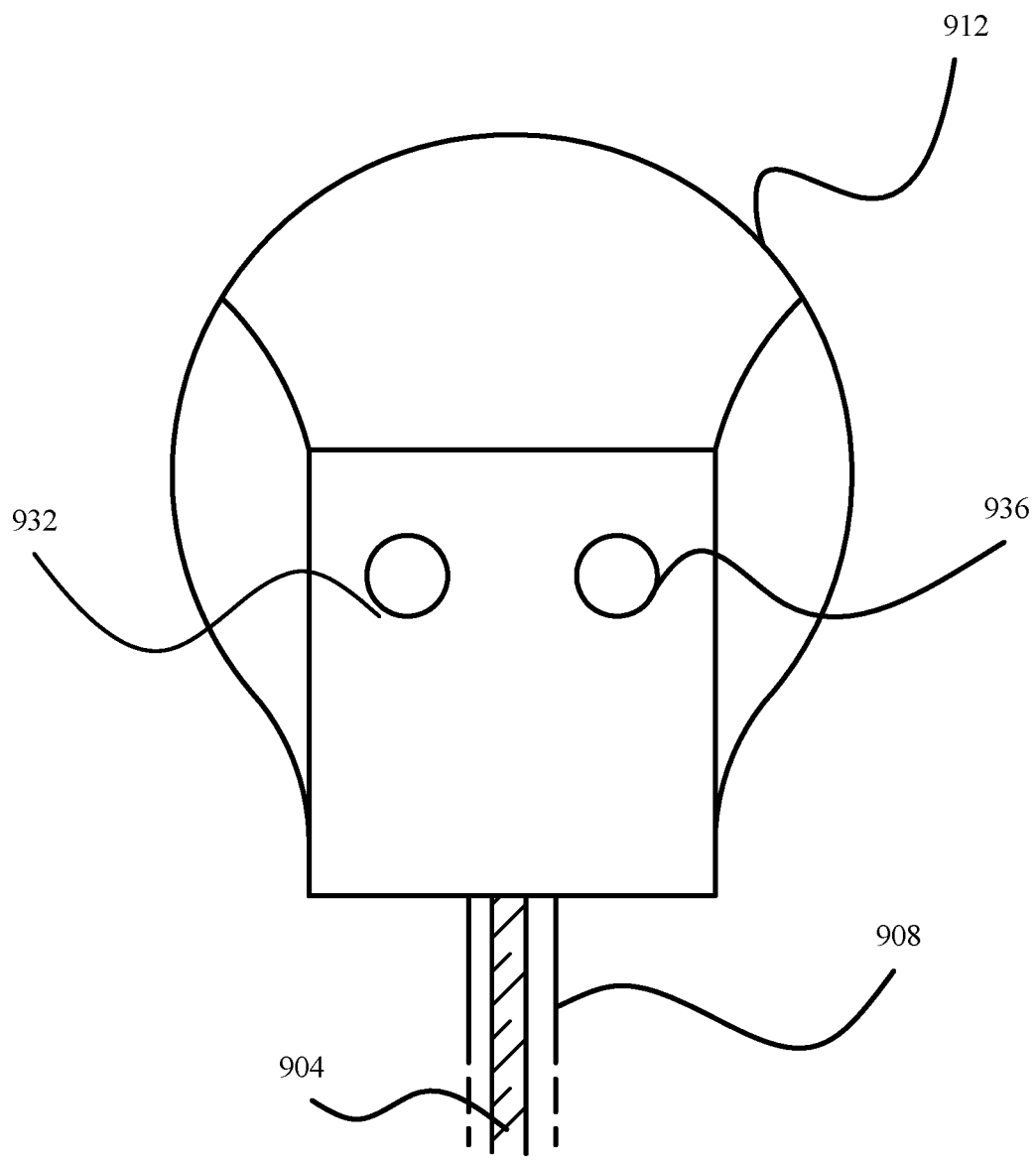
FIG. 9 is a flow diagram illustrating an exemplary embodiment of a method of recharging an electric aircraft.

Now referring to FIG. 9, an exemplary embodiment of a charging connector 912. Charging cable 908 may be electrically connected to charging connector 912. Charging connector 912 may be disposed at one end of charging cable 908. Reel toggle 932 and reel locking toggle 936 may be disposed on the surface of charging connector 912. In some embodiments, charging connector may have a handle portion on which reel toggle 932 and reel locking toggle may be disposed. In some embodiments, reel toggle 932 and cable reel toggle 932 may be disposed on charging connector 912 such that a user that is holding charging connector is able to easily reach and use reel toggle 932 and cable reel toggle 932. Charging connector 912 may be configured to couple with a corresponding charging port on an electric aircraft. For the purposes of this disclosure, a "charging connector" is a device adapted to electrically connect a device to be charged with an energy source. For the purposes of this disclosure, a "charging port" is a section on a device to be charged, arranged to receive a charging connector. charging connector 912 may include a variety of pins adapted to mate with a charging port disposed on an electric aircraft. The variety of pins included on charging connector 912 may include, as non-limiting examples, a set of pins chosen from an alternating current (AC) pin, a direct current (DC) pin, a ground pin, a communication pin, a sensor pin, a proximity pin, and the like. In an embodiment, communication pin on the charging connector 912 may relay data to and from the electrical aircraft to the recharging station. In some embodiments, charging connector 912 may include more than one of one of the types of pins mentioned above.

With continued reference to FIG. 9, for the purposes of this disclosure, a "pin" may be any type of electrical connector. An electrical connector is a device used to join electrical conductors to create a circuit. As a non-limiting example, in some embodiments, any pin of charging connector 912 may be the male component of a pin and socket connector. In other embodiments, any pin of charging connector 912 may be the female component of a pin and socket connector. As a further example of an embodiment, a pin may have a keying component. A keying component is a part of an electrical connector that prevents the electrical connector components from mating in an incorrect orientation. As a non-limiting example, this can be accomplished by making the male and female components of an electrical connector asymmetrical. Additionally, in some embodiments, a pin, or multiple pins, of charging connector 912 may include a locking mechanism. For instance, as a non-limiting example, any pin of charging connector 912 may include a locking mechanism to lock the pins in place. The pin or pins of charging connector 912 may each be any type of the various types of electrical connectors disclosed above, or they could all be the same type of electrical connector. One of ordinary skill in the art, after reviewing the entirety of this disclosure, would understand that a wide variety of electrical connectors may be suitable for this application.

Additional details on electric aircraft charging with a cable reel can be found in non-provisional application Ser. No. 17/736,530 filed on May 4, 2022 and entitled "SYSTEM FOR AN ELECTRIC AIRCRAFT CHARGING WITH A CABLE REEL", the entirety of which is incorporated herein by reference.

Figure 10:
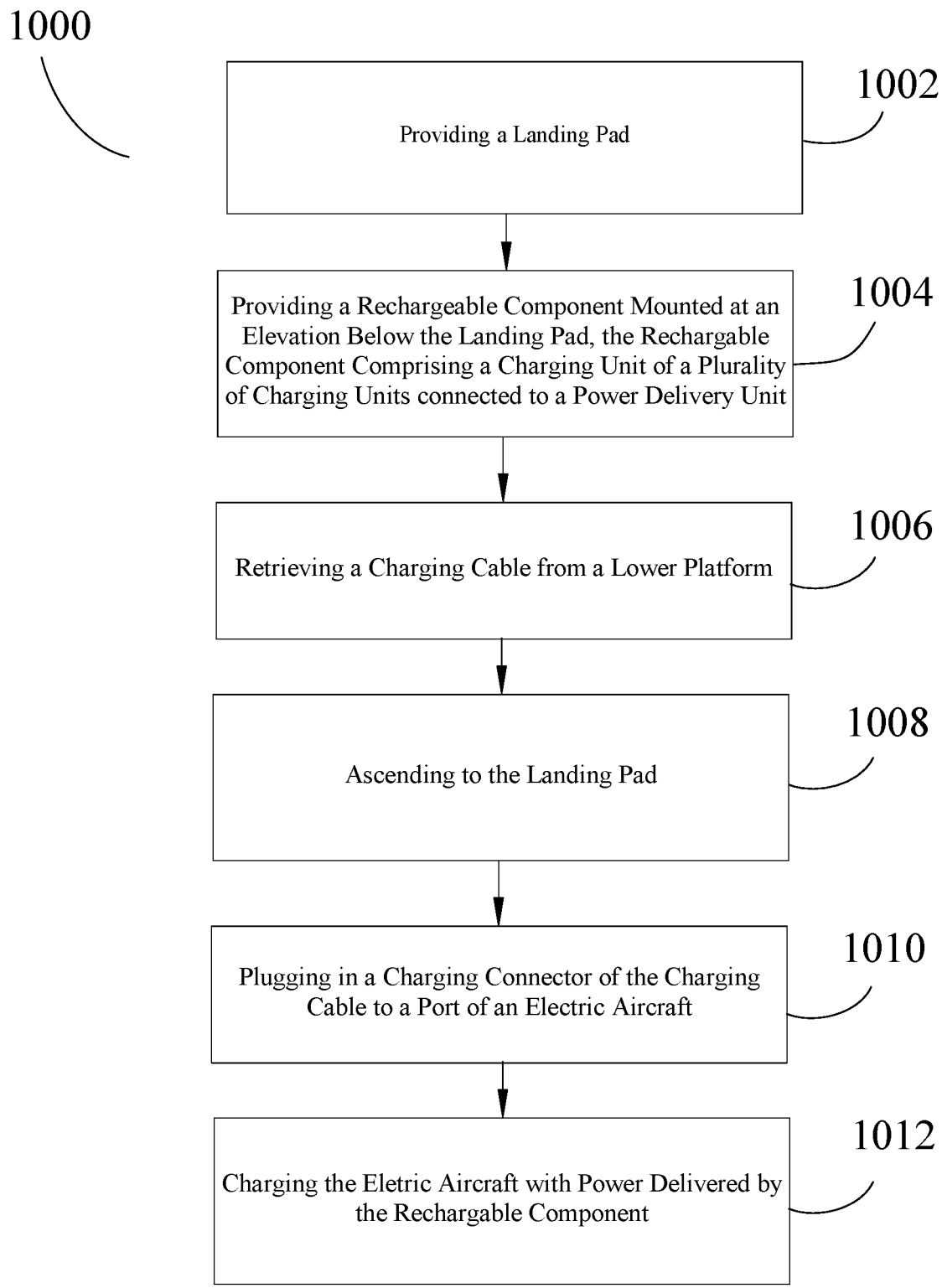
FIG. 10 is a block diagram of an exemplary embodiment of a computing system.

FIG. 10 illustrates a flowchart 1000 for a method of recharging an electric aircraft. At step 1002, a landing pad is provided. In one embodiment, the landing pad may include a helideck or helipad. The landing pad may include an integrated deicing system. In one embodiment, the integrated deicing system may clear obstruction from snow, ice, sleet, hail, or other forms of precipitation. The landing pad may also include an integrated lighting system. The integrated lighting system may provide night vision goggle compatibility. In some embodiments, providing a landing pad may include the rapid construction of modular housing units to provide an elevated support for the landing pad. In some embodiments, the landing pad may be provided in densely populated cities. The landing pad may be constructed on top of a pre-existing building to clear the landing zone of any obstruction. In other embodiments, the landing pad may be constructed in a rural area isolated from cities and buildings. In some embodiments, the landing pad may be provided in a location along a flight path of an electric vehicle. In some embodiments, landing pad may include a plurality of charging units such that they are arranged to maximize space distribution between adjacent charging units.

At step 1004, rechargeable component mounted at an elevation below the landing pad, the rechargeable component including a charging unit of a plurality of charging units connected to a power delivery unit is provided. Power delivery unit may be configured to deliver power stored from a power storage unit. Power storage unit may have a storage capacity of at least 500 kwh. Power storage unit may include a battery pack to store power. Power delivery unit is configured to connect to the power storage unit through a DC-to-DC converter.

At step 1006, an electric aircraft placed on the landing pad is connected to the rechargeable component. Connecting to the rechargeable component includes the following steps. Step 1008 includes retrieving a charging cable from a lower platform. Charging units may be on a platform on the support base. Retrieving a charging cable may include using a hydraulic lift system to transport people to the lower platform to retrieve the cable. In one embodiment, the connection between the rechargeable component and the electric aircraft may be wired. In another embodiment, this connection may be wireless. In some embodiments, the connection between the electric aircraft and the rechargeable component may be automated. In some embodiments, the connection may include a charging cord. Step 1010 includes ascending to the landing pad. Ascending to the landing pad may include using the hydraulic lift system. Step 1012 includes plugging in a charging connector of the charging cable to a port of an electric aircraft. The port of an electric aircraft may be opposite of the passenger egress. Rechargeable component may charge two or more electric aircrafts. Each aircraft may use one of a plurality of charging units in the rechargeable component.

At step 1014, the electric aircraft is charged with the power delivered by the rechargeable component. The electric aircraft may be rapidly charged to full capacity as soon as possible. In other embodiments, the electric aircraft may have a scheduled charge that adaptably increases or decreases the rate at which the electric aircraft is charged. In one embodiment, the electric aircraft may be charged at a slow and steady rate overnight. In one embodiment, the electric aircraft may trickle charge so as to maintain the health of the electric aircraft's battery.

Referring now to FIG. 11, an exemplary embodiment of a system 1100 for monitoring and transferring data to and from an electric aircraft is illustrated. System 1100 includes a computing device 1102. The computing device 1102 may include any computing device as described in this disclosure, including without limitation a microcontroller, microprocessor, digital signal processor (DSP) and/or system on a chip (SoC) as described in this disclosure. The computing device 1102 may include, be included in, and/or communicate with a mobile device such as a mobile telephone or smartphone. The computing device 1102 may include a single computing device operating independently, or may include two or more computing device operating in concert, in parallel, sequentially or the like; two or more computing devices may be included together in a single computing device or in two or more computing devices. The computing device 1102 may interface or communicate with one or more additional devices as described below in further detail via a network interface device 1106. Network interface device 1106 may be utilized for connecting the computing device 1102 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. The computing device may include but is not limited to, for example, a computing device or cluster of computing devices in a first location and a second computing device or cluster of computing devices in a second location. The computing device 1102 may include one or more computing devices dedicated to data storage, security, distribution of traffic for load balancing, and the like. The computing device 1102 may distribute one or more computing tasks as described below across a plurality of computing devices of computing device, which may operate in parallel, in series, redundantly, or in any other manner used for distribution of tasks or memory between computing devices. the computing device may be implemented using a "shared nothing" architecture in which data is cached at the worker, in an embodiment, this may enable scalability of system 1100 and/or computing device 1102.

With continued reference to FIG. 11, the computing device 1102 may be designed and/or configured to perform any method, method step, or sequence of method steps in any embodiment described in this disclosure, in any order and with any degree of repetition. For instance, the computing device 1102 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. The computing device 1102 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

The computing device 1102 may include a display screen 1104. The display screen 1104 may be of any width, height, thickness, and brightness. In some embodiments, the display screen 1104 may be an LED or OLED screen. The computing device 1102 may be configured to have a camera 1108. Camera 1108 may receive optical data and report it to the computing device 1102, thereby providing facial recognition and security. In some embodiments, the computing device 1102 may be connected to a database 1110.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding may readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 12:
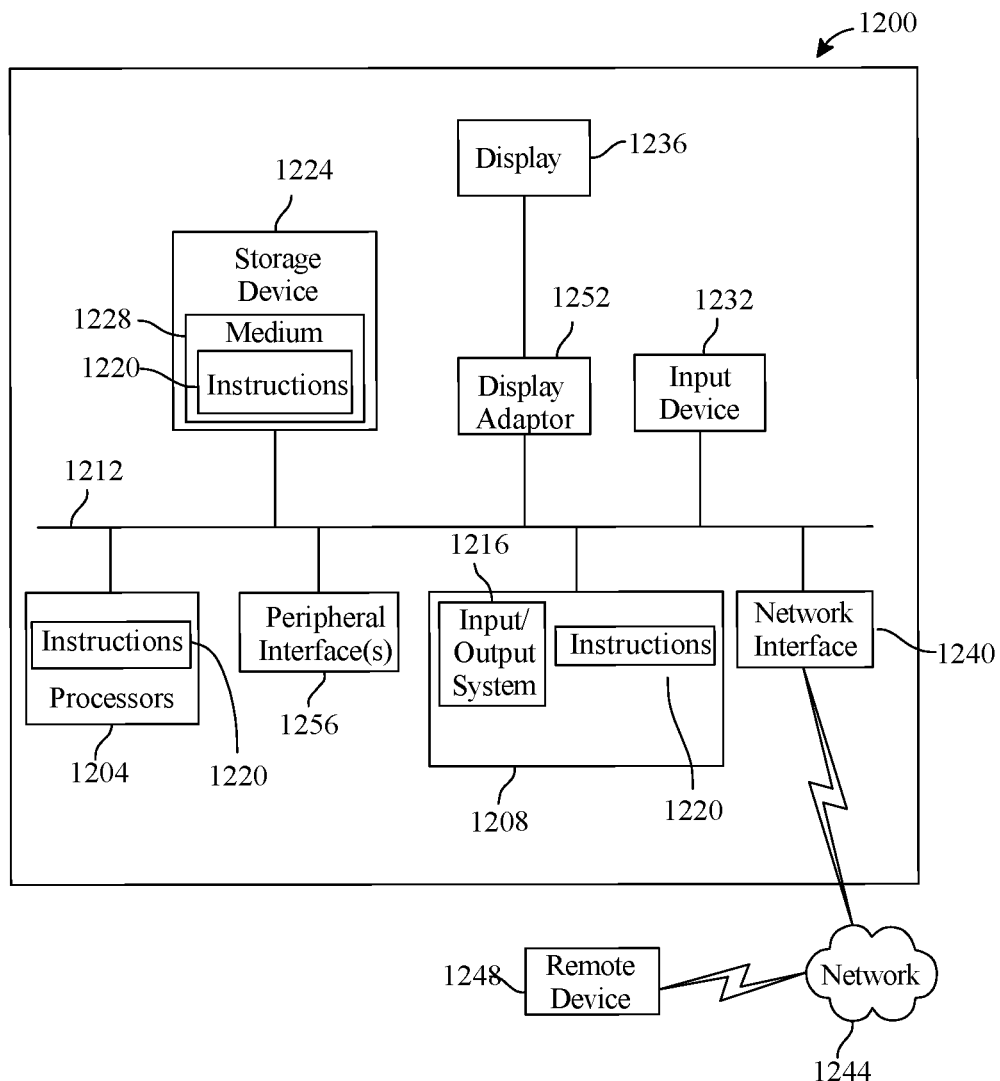
FIG. 12 is a diagrammatic representation of one embodiment of a computing device in the exemplary form of a computer.

FIG. 12 shows a diagrammatic representation of one embodiment of a computing device in the exemplary form of a computer system 1200 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1200 includes a processor 1204 and a memory 1208 that communicate with each other, and with other components, via a bus 1212. Bus 1212 may include any of several types of bus structures including, but not limited to, a memory bus, a memory controller, a peripheral bus, a local bus, and any combinations thereof, using any of a variety of bus architectures.

Processor 1204 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1204 may be organized according to Von Neumann and/or Harvard architecture as a non-limiting example. Processor 1204 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 1208 may include various components (e.g., machine-readable media) including, but not limited to, a random-access memory component, a read only component, and any combinations thereof. In one example, a basic input/output system 1216 (BIOS), including basic routines that help to transfer information between elements within computer system 1200, such as during start-up, may be stored in memory 1208. Memory 1208 may also include (e.g., stored on one or more machine-readable media) instructions (e.g., software) 1220 embodying any one or more of the aspects and/or methodologies of the present disclosure. In another example, memory 1208 may further include any number of program modules including, but not limited to, an operating system, one or more application programs, other program modules, program data, and any combinations thereof.

Computer system 1200 may also include a storage device 1224. Examples of a storage device (e.g., storage device 1224) include, but are not limited to, a hard disk drive, a magnetic disk drive, an optical disc drive in combination with an optical medium, a solid-state memory device, and any combinations thereof. Storage device 1224 may be connected to bus 1212 by an appropriate interface (not shown). Example interfaces include, but are not limited to, SCSI, advanced technology attachment (ATA), serial ATA, universal serial bus (USB), IEEE 1264 (FIREWIRE), and any combinations thereof. In one example, storage device 1224 (or one or more components thereof) may be removably interfaced with computer system 1200 (e.g., via an external port connector (not shown)). Particularly, storage device 1224 and an associated machine-readable medium 1228 may provide nonvolatile and/or volatile storage of machine-readable instructions, data structures, program modules, and/or other data for computer system 1200. In one example, software 1220 may reside, completely or partially, within machine-readable medium 1228. In another example, software 1220 may reside, completely or partially, within processor 1204.

Computer system 1200 may also include an input device 1232. In one example, a user of computer system 1200 may enter commands and/or other information into computer system 1200 via input device 1232. Examples of an input device 1232 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1232 may be interfaced to bus 1212 via any of a variety of interfaces (not shown) including, but not limited to, a serial interface, a parallel interface, a game port, a USB interface, a FIREWIRE interface, a direct interface to bus 1212, and any combinations thereof. Input device 1232 may include a touch screen interface that may be a part of or separate from display 1236, discussed further below. Input device 1232 may be utilized as a user selection device for selecting one or more graphical representations in a graphical interface as described above.

A user may also input commands and/or other information to computer system 1200 via storage device 1224 (e.g., a removable disk drive, a flash drive, etc.) and/or network interface device 1240. A network interface device, such as network interface device 1240, may be utilized for connecting computer system 1200 to one or more of a variety of networks, such as network 1244, and one or more remote devices 1248 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1244, may employ a wired and/or a wireless mode of communication. In general, any network topology may be used. Information (e.g., data, software 1220, etc.) may be communicated to and/or from computer system 1200 via network interface device 1240.

Computer system 1200 may further include a video display adapter 1252 for communicating a displayable image to a display device, such as display device 1236. Examples of a display device include, but are not limited to, a liquid crystal display (LCD), a cathode ray tube (CRT), a plasma display, a light emitting diode (LED) display, and any combinations thereof. Display adapter 1252 and display device 1236 may be utilized in combination with processor 1204 to provide graphical representations of aspects of the present disclosure. In addition to a display device, computer system 1200 may include one or more other peripheral output devices including, but not limited to, an audio speaker, a printer, and any combinations thereof. Such peripheral output devices may be connected to bus 1212 via a peripheral interface 1256. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions may be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

The invention claimed is:

1. A recharging station for an electric aircraft, the apparatus comprising:
    a landing pad having an upper surface;
    a rechargeable component mounted to the landing pad, wherein the rechargeable component comprises:
        a power delivery unit configured to deliver stored power from a power supply unit to an electric aircraft;
        a plurality of charging units wherein each charging unit is located at a predetermined spacing from one another, each charging unit of the plurality of charging units comprising:
            a charging connector configured to mate with a port of an electric aircraft; and
            a charging cable electronically connecting the charging connector and the power delivery unit, wherein the charging cable is retrieved using a hydraulic lift system; and
        an upper extremity, the upper extremity located one foot or less above the upper surface.

2. The apparatus of claim 1, wherein the rechargeable component further comprises a trickle charger.

3. The apparatus of claim 1, wherein the charging cable further comprises a cable reel.

4. The apparatus of claim 1, wherein the power supply unit includes a solar inverter for on-site power generation.

5. The apparatus of claim 1, wherein the recharging station is configured to communicate data with an electric aircraft through a communication pin on the charging connector.

6. The apparatus of claim 1, wherein the electric aircraft is an eVTOL.

7. The apparatus of claim 1, wherein the port of the electric aircraft is located on an opposite side of the electric aircraft from a passenger egress.

8. The apparatus of claim 1, further comprising a support component coupled to the bottom of the landing pad.

9. The apparatus of claim 8, wherein the support component comprises the hydraulic lift system configured to move one or more persons and cargo to the landing pad.

10. The apparatus of claim 1, wherein the plurality of charging units are placed on either side of the landing pad.

11. The apparatus of claim 10, wherein the plurality of charging units are placed at the center of each side of the landing pad.

12. The apparatus of claim 10, wherein the plurality of charging units are places on the corner of each side of the landing pad.

13. A method of charging an electric aircraft using an elevated landing pad, the method comprising:
    providing a landing pad;
    providing a rechargeable component mounted at an elevation below the landing pad, the rechargeable component comprising a charging unit of a plurality of charging units connected to a power delivery unit;
    connecting an electric aircraft on the landing pad to the rechargeable component, wherein connecting the electric aircraft comprises:
        retrieving a charging cable from a lower platform, wherein a hydraulic lift system is used to retrieve the charging cable from the lower platform;
        ascending to the landing pad; and
        plugging in a charging connector of the charging cable to a port of the electric aircraft; and
    charging the electric aircraft with power delivered by the rechargeable component.

14. The method of claim 13, wherein the power delivery unit is configured to deliver power stored in a power storage unit.

15. The method of claim 13, wherein the power storage unit has a storage capacity of at least 500 kwh.

16. The method of claim 13, wherein the power delivery unit is configured to connect to the power storage unit through a DC to DC converter.

17. The method of claim 13, wherein two or more electric aircrafts are charged through the rechargeable component.

18. The method of claim 13, wherein the charging units of the plurality of charging units are placed on either side of the landing pad.

19. The apparatus of claim 13, wherein the charging units are placed at the center of each side of the landing pad.

* * * * *